United States Patent [19]

Harris et al.

[11] Patent Number: 5,109,098
[45] Date of Patent: Apr. 28, 1992

[54] IMINES AND SECONDARY AMINES CONTAINING HYDROGEN BONDING MOIETIES IN THEIR BACKBONE AND POLYMERS MADE THEREFROM

[75] Inventors: Robert F. Harris, Midland; Clarence E. Habermann, Traverse City; Michael D. Joseph, Midland, all of Mich.

[73] Assignee: The Dow Chemical Company, Midland, Mich.

[21] Appl. No.: 497,383

[22] Filed: Mar. 21, 1990

[51] Int. Cl.$^5$ .................... C08G 18/00; C08G 18/32; C08G 18/14
[52] U.S. Cl. ........................ 528/78; 128/58; 128/59; 128/60; 128/61; 128/64; 128/65; 128/76; 128/77
[58] Field of Search ............... 528/78, 75, 73, 196, 528/58, 59, 60, 61, 64, 65, 76, 77; 521/163

[56] References Cited

U.S. PATENT DOCUMENTS

| | | | |
|---|---|---|---|
| 4,689,353 | 8/1987 | Harris | 521/159 |
| 4,916,201 | 4/1990 | Harris | 528/60 |
| 4,935,460 | 6/1990 | Cassidy et al. | 528/78 |
| 4,959,499 | 9/1990 | Harris | 528/196 |
| 5,055,544 | 10/1991 | Harris et al. | 528/59 |

*Primary Examiner*—John Kight, III
*Assistant Examiner*—Duc Truong

[57] ABSTRACT

Imines and secondary amines comprising a backbone portion containing a plurality of polyalkyleneoxy moieties and one or more internal urea, thiourea, biuret, thiobiuret, amide, or thioamide moieties, and a plurality of imino or secondary amino end groups, wherein each imino or secondary amino end group is separated from a urea, thiourea, biuret, dithiobiuret, amide, or thioamide moiety by at least one alkylene, cycloalkylene, aralkylene, arylene, alkyleneoxy, or ppolyalkyleneoxy moiety are disclosed. Prepolymers and polymers prepared from the imines and secondary amines are also disclosed. In addition, the imines and secondary amines of the invention are also useful as epoxy resin curing agents.

33 Claims, No Drawings

IMINES AND SECONDARY AMINES CONTAINING HYDROGEN BONDING MOIETIES IN THEIR BACKBONE AND POLYMERS MADE THEREFROM

CROSS-REFERENCE TO RELATED APPLICATIONS

This application is related to copending U.S. application Ser. No. 247,460, filed Sep. 21, 1988, now U.S. Pat. No. 4,916,201, issued Apr. 10, 1990, which is a continuation-in-part of Ser. No. 099,027, filed Sep. 21, 1987, abandoned; Ser. No. 926,692, filed Nov. 4, 1986, abandoned; Ser. No. 000,227, filed Jan. 2, 1987, now U.S. Pat. No. 4,959,499, issued Sep. 25, 1990; U.S. Pat. No. 4,689,353; U.S. application Ser. No. 254,503, filed Oct. 6, 1988 pending, Ser. No. 310,107, filed Feb. 10, 1989, Ser. No. 485,678 filed Feb. 28, 1990, U.S. Pat. No. 5,055,544 by the same inventor.

BACKGROUND OF THE INVENTION

This invention relates to secondary amines having backbones containing (1) polyether moieties and (2) hydrogen-bonding moieties and to urethane/urea prepolymers and polymers thereof and to epoxy resins cured with such polyamines. These polyamines are useful as an active hydrogen component in the reaction with a polyisocyanate to form urea/urethane polymers and are also useful as chain extenders and curing agents for epoxy resins.

In general it is known to prepare polyurethanes containing urea moieties by the reaction of a polyol and water with an isocyanate and a chain extender as disclosed in Sweeney, *Reaction Injection Molding Machinery and Processes* (1987). Many other types of polymers and oligomers containing urea moieties in their backbone are known materials which can be prepared in a variety of ways. The majority of such materials are prepared by the reaction of an isocyanate with an amine. The resulting products can range from simple monomers as disclosed in U.S. Pat. Nos. 3,294,749; 3,386,955; and 3,386,956, to oligomers as disclosed in U.S. Pat. Nos. 3,248,424 and 4,332,953, to soluble polymers as disclosed in U.S. Pat. No. 3,639,338, to dispersions in polyols as disclosed in German Patent 3,125,402. It is generally known that the introduction of urea moieties into a polyurea/urethane polymer improves the high temperature mechanical properties of the polymer.

Compounds or polymers containing trifunctional biuret moieties are generally produced by the reaction of a polyisocyanate with water. In such a reaction, a small number of isocyanate moieties are hydrolyzed to amino moieties by reaction with water. These amino moieties, in the presence of larger quantities of isocyanate moieties, react to form polyisocyanates containing urea moieties. Further reaction of the urea moieties with additional polyisocyanates produces polyisocyanates containing biuret moieties. These biuret-containing isocyanates have been known for many years and have been used in a variety of applications, for example as shown in U.S. Pat. Nos. 4,028,313; 4,203,875; 4,284,544; 4,289,813; 4,305,977; 4,388,245; and 4,449,591. It is generally recognized that the inclusion of trifunctional biuret moieties into a polyurea/urethane polymer produces a material having increased cross-link density.

Polyamides of polycarboxylic acid and poly(alkyleneoxy)polyamines are well-known compositions. Polyurethane coating compositions based on the reaction products of poly(propyleneoxy)polyamines with isocyanate-polyol prepolymers blocked with lactams are disclosed in JP 59/226062 (1984). Polyether polyols containing amide groups produced from partially aminated polyether polyols and adipoyl chloride or terephthaloyl chloride by reactions with isocyanates to produce urethane polymers are disclosed in DE 2,559,372 (1977). Imines of polyether polyamines are disclosed in U.S. Pat. No. 4,789,691 (1988).

It is also known to prepare isocyanate-functional prepolymers having urea moieties or biuret moieties or combinations thereof. Such isocyanate-functional prepolymers are prepared by first reacting a polyhydroxyl compound such as a polyether polyol with excess isocyanate. The resulting isocyanate-functional prepolymer is then chain-extended with reactions with polyamine or amino alcohols to produce polymers containing urethane and urea moieties in their backbones, such as shown in U.S. Pat. Nos. 3,471,449; 3,583,937; 3,627,714; 3,668,173 and 3,936,409. In some instances, the polymers contain only urea moieties in their backbones. In other cases, the polymers contain both urea and biuret moieties in their backbones. It is also known to react an isocyanate-functional prepolymer with a monofunctional amine to give polymers or oligomers which contain urea moieties near the end of the molecule as shown in U.S. Pat. No. 4,522,986.

In the polyurethanes and polyureas of the prior art containing urea and/or biuret moieties, the urea and/or biuret moieties are found to reside only in the hard segment of the resulting polyurethane or polyurea. Such polyureas/urethanes are observed to exhibit properties such as modulus, strength, hardness, toughness and solvent resistance which are less than are desired for many applications.

In the field of epoxy resins, it is also known to employ polyamines as curing agents for a wide variety of epoxy resins such as the polyglycidyl ethers of polyphenols including, for example, the epoxy novolacs and the bisphenol-A based epoxy resins. Unfortunately, these resins cured with conventional polyamines often do not have the toughness desired for many applications.

In view of such deficiencies of such prior art materials, it would be highly desirable to provide a polyurethane or polyurea having the desirable properties contributed by having urea, thiourea, dithiobiuret and/or biuret moieties without sacrificing significantly the properties of modulus, strength, hardness, toughness and solvent resistance. Further it is desirable to provide advanced epoxy resins having increased toughness.

SUMMARY OF THE INVENTION

In one aspect, this invention is an imine comprising
a backbone portion containing a plurality of polyalkyleneoxy moieties and one or more internal urea, thiourea, biuret, thiobiuret, amide, or thioamide moieties, and
a plurality of imino end groups,
wherein each imino end group is separated from a urea, thiourea, biuret, dithiobiuret, amide, or thioamide moiety by at least one alkylene, cycloalkylene, aralkylene, arylene, alkyleneoxy, or polyalkyleneoxy moiety with 4–20 carbon atoms.

In a second aspect, this invention is a secondary amine comprising a backbone portion containing a plurality of polyalkyleneoxy moieties and one or more internal urea, thiourea, biuret, dithiobiuret, amide, or thioamide moieties, and a plurality of secondary amino end groups, wherein each amine end group is separated from a urea, thiourea, biuret, dithiobiuret, amide, or thioamide moiety by at least one alkylene, cycloalkylene, aralkylene, arylene, alkyleneoxy, or polyalkyleneoxy moiety with 4-20 carbon atoms.

In a third aspect, this invention is a process for preparing an imine containing at least one internal urea, thiourea, biuret, thiobiuret, amide, or thioamide moiety in its backbone, which comprises contacting (a) a modified polyamine comprising a backbone portion containing at least one polyalkyleneoxy moiety and one or more internal urea, thiourea, biuret, dithiobiuret, amide, or thioamide moieties, and a plurality of primary amino end groups wherein each amino end group is separated from each urea, thiourea, biuret, dithiobiuret, amide, or thioamide moiety by at least one alkylene, cycloalkylene, aralkylene, arylene, alkyleneoxy, or polyalkyleneoxy moiety with 4-20 carbon atoms; with (b) an aldehyde or ketone under reaction conditions effective to form an imine.

In a fourth aspect, this invention is a process for preparing a secondary amine containing at least one internal urea, thiourea, biuret, thiobiuret, amide, or thioamide moiety in its backbone, which comprises hydrogenating an imine comprising a backbone portion containing at least one polyalkyleneoxy moiety and one or more internal urea, thiourea, biuret, dithiobiuret, amide, or thioamide moieties, and a plurality of imino end groups wherein each imino end group is separated from each urea, thiourea, biuret, dithiobiuret, amide, or thioamide moiety by at least one alkylene, cycloalkylene, aralkylene, arylene, alkyleneoxy, or polyalkyleneoxy moiety with 4-20 carbon atoms under reaction conditions effective to form a secondary amine.

In a fifth aspect, this invention is an isocyanate-functional prepolymer which comprises the reaction product of (1) a secondary amine comprising a backbone portion containing a plurality of polyalkyleneoxy moieties and one or more internal urea, thiourea, biuret, thiobiuret, amide, or thioamide moieties, and a plurality of secondary amino end groups, wherein each amino end group is separated from a urea, thiourea, biuret, dithiobiuret, amide, or thioamide moiety by at least one alkylene, cycloalkylene, aralkylene, arylene, alkyleneoxy, or polyalkyleneoxy moiety with 4-20 carbon atoms with (2) an excess over stoichiometry of a polyisocyanate.

In a sixth aspect, this invention is a polymer formed by the reaction of the aforementioned isocyanate-functional prepolymer with at least one polyahl.

In a seventh aspect, this invention is a urethane/urea polymer formed by the reaction of one or more secondary amines with a backbone portion containing a plurality of polyalkyleneoxy moieties and one or more moieties selected from the group consisting of urea, biuret, thiourea, dithiobiuret, thioamide, amide, urethane, and thiourethane with at least one organic polyisocyanate. In this seventh aspect, it is optional and often preferred to employ, in addition to the aforementioned polyamine, one or more other polyahls in the reaction to form the urethane/urea polymer.

In an eighth aspect, this invention is a post-cured urethane/urea polymer which has physical properties substantially better than those of the polymer prior to the post-cure.

In a ninth aspect, this invention is an isocyanate-functional prepolymer which comprises the reaction product of (1) an imine comprising a backbone portion containing a plurality of polyalkylaneoxy moieties and one or more internal urea, thiourea, biuret, dithiobiuret, amide, or thioamide moieties, and a plurality of imine end groups, wherein each imine end group is separated from a urea, thiourea, biuret, dithiobiuret, amide, or thioamide by at least one alkylene, cycloalkylene, aralkylene, arylene, alkyleneoxy, or polyalkyleneoxy moiety with 4-20 carbon atoms with (2) an excess over stoichiometry of a polyisocyanate.

In a tenth aspect, this invention is a polymer formed by the reaction of the above isocyanate-functional prepolymer with at least one polyahls.

In an eleventh aspect, this invention is a polymer formed by the reaction of one or more imines with a backbone portion containing a plurality of polyalkylaneoxy moieties and one or more moieties selected from the group consisting of urea, biuret, thiourea, dithiobiuret, amide, and thioamide with at least one organic polyisocyanate.

The resulting urethane/urea polymers of this invention have superior properties such as higher modulus, greater strength, increased hardness and toughness and superior solvent resistance when compared to similar polymers which do not contain either urea, biuret, thiourea, dithiobiuret, thioamide, or amide moieties, and polyalkyleneoxy moieties. The increased modulus observed for the polymers of this invention prepared from aliphatic polyamines enable the manufacture of plastic parts having superior stiffness at lower hard segment contents which results in less cost than conventional polyurethane/urea polymers. The polymers of this invention also exhibit superior green strength on demold when fabricated in reaction injection molding equipment. This superior green strength allows the use of lower mold temperatures which results in economic and handling advantages. In many cases, the urethane/urea polymers of this invention cure faster than conventional urethane/urea polymers. This results in the economic advantage of reduced cure schedules.

In a twelfth aspect, this invention is a composition comprising an epoxy resin and the imine of the first aspect of the invention or the secondary amine of the second aspect of the invention, or a mixture thereof, wherein the imine or secondary amine is present in an amount effective to extend and/or cure the epoxy resin. Extended or advanced products can be converted to cured products using conventional crosslinking agents. Such cured products prepared by either procedure exhibit greater toughness than epoxy reins extended or cured with conventional polyamines.

DETAILED DESCRIPTION OF THE INVENTION

The imines of the invention are preferably diimines of the following formulae:

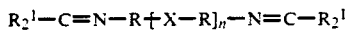

or

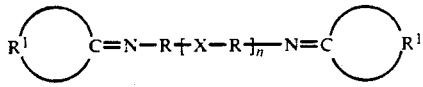

wherein each R is independently in each occurrence an alkylene, cycloalkylene, aralkylene, aryl, alkyleneoxy, or polyalkyleneoxy moiety, wherein at least one R is polyalkyleneoxy; $R^1$ is independently in each occurrence hydrogen, alkyl, aralkyl, aryl, cycloalkyl or $R^1$ can combine with the imine carbon to form a cyclic ring having carbon atoms; X is independently in each occurrence an acyclic moiety selected from the group consisting of urea, biuret, thiourea, dithiobiuret, amide, and thioamide; and n is an integer between 1 and 50, and preferably between 2 and 50. It is understood that when an acyclic urea moiety is present, X is —NHC(O)NH—; when an acyclic biuret moiety is present, X is —NHC(O)NHC(O)NH—; and when amide moieties are present, X is —NHC(O)$R^2$C(O)NH—, wherein $R^2$ is an alkylene, arylene, cycloalkylene, aralkylene, or alkylarylene group. In the definition of R, it is understood that polyalkyleneoxy includes alkyleneoxy moieties which can contain from 2 to 24 carbon atoms and can be substituted with moieties that are inert to the reaction of an amino group with isocyanate, thioisocyanate, biuret, thiobiuret, urea, or thiourea. In the definition of X, it is understood that amide includes amide moieties which can be substituted with moieties that are inert to the reaction of an amino group with isocyanate, thioisocyanate, biuret, thiobiuret, urea, or thiourea, and aminofunctional moieties. Triimines and higher functionality imines may be formed from the corresponding polyamines.

The imines of the invention which contain at least one internal urea, thiourea, biuret, thiobiuret, amide, or thioamide moiety in their backbone may be prepared by contacting a modified primary polyamine containing a urea, thiourea, biuret, dithiobiuret, amide, or thioamide moiety in its backbone with an aldehyde or ketone under reaction conditions effective to from an imine. Preferably, the imine is prepared form a ketone, which is preferably cyclohexanone or cyclopentanone. The term "ketimine" as used herein, refers to the imine of the invention which is prepared from a ketone.

The secondary amines of the invention are preferably of the following formula:

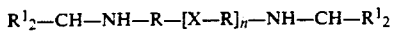

wherein each R, $R^1$, n, and X are as defined above.

The secondary amines of the invention may be prepared by hydrogenating an imine comprising a backbone containing at least one polyalkyleneoxy moiety and one or more internal urea, thiourea, biuret, dithiobiuret, amide, or thioamide moieties, and a plurality of imino end groups wherein each imino end group is separated from each urea, thiourea, biuret, dithiobiuret, amide, or thioamide moiety by at least one alkylene, cycloalkylene, aralkylene, arylene, alkyleneoxy, or polyalkyleneoxy moiety with 4-20 carbon atoms under reaction conditions effective to form a secondary amine.

The modified primary polyamines which may be used to prepare the imines of the invention and contain at least one internal urea, thiourea, biuret, thiobiuret, amide, or thioamide moiety in their backbone are generally represented by the formula:

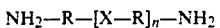

wherein each R is independently in each occurrence an alkylene, cycloalkylene, aralkylene, aryl, alkyleneoxy, or polyalkyleneoxy moiety, wherein at least one R is polyalkyleneoxy; X is independently in each occurrence an acyclic moiety selected from the group consisting of urea, biuret, thiourea, dithiobiuret, amide, and thioamide; and n is an integer between 1 and 50. Modified primary polyamines which contain urea or amide moieties are particularly preferred.

These modified primary polyamines may be prepared by contacting a polyalkyleneoxy polyamine with urea, thiourea, biuret, dithiobiuret, a polycarboxylic acid, or a polythiocarboxylic acid, or a combination thereof, optionally in the presence of a $C_{4-20}$ alkylene-, cycloalkylene-, aralkylene-, or arylene-polyamine. The preparation of these starting materials is described in copending application Ser. Nos. 247,460, filed Sep. 21, 1988; 254,503, filed Oct. 6, 1988; Ser. No. 485,678, filed Feb. 28, 1990, which are hereby incorporated by reference in their entirety. Preferably, the polyalkyleneoxy polyamine used to prepare the modified primary polyamine has an average molecular weight of less than about 1800, is more preferably less than about 500, and is most preferably about 400.

In one embodiment for the process of the invention for preparing imines, the aldehyde or ketone used to prepare the imines is preferably used in about a 25 percent by weight solution. The aldehyde or ketone is present in an amount sufficient to convert the desired number of primary amine functionalities to imine moieties. Preferably, the aldehyde or ketone is present in a ratio of aldehyde or ketone:amine end groups in the range of from about 0.1 to about 10, more preferably from about 1 to about 5, and most preferably from about 1 to about 3. This step is preferably carried out at a temperature of about 25° C., and the aldehyde or ketone and primary amine are preferably allowed to react for at least about 2 hours, but preferably no more than 24 hours. Preferably, this step is carried out in the absence of water, since water will hinder the reaction. This embodiment of the process is preferred when the imine is to be hydrogenated to the corresponding amine.

In a second embodiment of the process of the invention for preparing imines, the aldehyde or ketone is combined with the polyamine starting material in an inert solvent capable of removing the water by-product of the reaction by azeotropic distillation. Any solvent may be used which is compatible with the polyamine and which forms an azeotrope with water. Benzene, toluene, xylene, and cumene are examples of suitable solvents. To recover the imine, the reaction mixture containing the water, the imine, and any remaining reactants is heated until the water and any excess aldehyde or ketone has been removed by distillation, preferably at reduced pressure. This process is preferred for making ketimines.

If a secondary amine is to be prepared, the choice of aldehyde or ketone employed to prepare the imine starting material advantageously affects the reactivity of the secondary amino end group. The reactivity of the secondary amino end group is controlled by steric and/or basicity factors. For example, when an aliphatic aldehyde is employed to prepare the imine, the resultant secondary amine end group will be attached to a monosubstituted carbon atom. When an aliphatic ketone is used to prepare the imine, the resultant secondary amine end group will be attached to a disubstituted (more sterically hindered) carbon atom. If an aromatic aldehyde is employed, the resultant secondary amine will be attached to a benzylic or substituted benzylic carbon atom. Such a benzylic moiety greatly reduces the basicity of the secondary amino end group. Preferably, the aldehyde or ketone is acetone, acetaldehyde, methylethylketone, benzaldehyde, cyclohexanone, cyclopentanone, 4-methyl-2-pentanone or diethylketone, and most preferably is acetone or cyclohexanone.

During the process of this invention, the primary amine groups are converted to imine groups. Preferably, the process of the invention results in the conversion of at least about 50 percent of the primary amine groups to imine groups, more preferably at least about 80 percent, and most preferably at least about 90 percent. The lower conversions are used for imines that are going to be hydrogenated to the corresponding amines. The higher conversions are experienced with ketimines.

The hydrogenation process of the invention is carried out by contacting the imine with hydrogen or a hydrogen-containing material under reaction conditions sufficient to form the corresponding secondary amine. This process is preferably carried out in the presence of a catalyst. Preferably, the catalyst is palladium or platinum oxide, or palladium or platinum supported on aluminum oxide or graphite. The catalyst is preferably employed in an amount in the range of from about 1 percent to about 10 percent by weight of the imine. This step may be carried out using several different processes, such as a slurry process in a stirred batch reactor, in a trickle bed reactor, or in a flooded bed reactor. For example, the imine and catalyst can be placed in a stirred, high pressure reactor which is then pressurized with hydrogen gas. The reactor can then be heated to 100° C.-150° C. for 5 hours, which will reduce the imine to the corresponding secondary amino end group.

The hydrogenation process is preferably carried out at a temperature in the range from about ambient temperature (25° C.) to about 200° C., more preferably no less than about 100° C. and no greater than about 150° C. The contact time for a batch reactor is preferably at least about 1 hour and less than about 5 hours, and is preferably about 5 hours. For a flooded bed reactor, the contact time is preferably at least about 2 minutes and less than about 3 hours, and is more preferably at least about 30 minutes and less than about 2 hours. The hydrogenation pressure is preferably in the range from 0 psig to about 1000 psig, and more preferably is no less than about 200 psig, and no greater than about 400 psig. In a continuous reactor, the hydrogen flow rate is preferably no less than about 50 cc/min, more preferably no less than about 500 cc/min, and is preferably no greater than about 1000 cc/min, more preferably no greater than about 700 cc/min. The above-described reaction conditions advantageously allow complete conversion to occur, and prevent cleavage of the polyamine backbone from occurring.

If a fluid bed reactor is used, the catalyst can be pumped through the heated bed at 100° C. and 500 psi pressure and collected in an appropriate container. Regardless of reactor used, the product may contain volatile materials such as acetone, isopropanol, or water, which may be stripped from the product in a simple still such as a wiped film evaporator operated at about 125° C.

Some amine-functional materials can function as secondary amines by ketimine-enamine tautomersim and, therefore, do not require a hydrogenation step. Imines of cyclohexane and cyclopentane are particularly useful. This equilibrium is shown below:

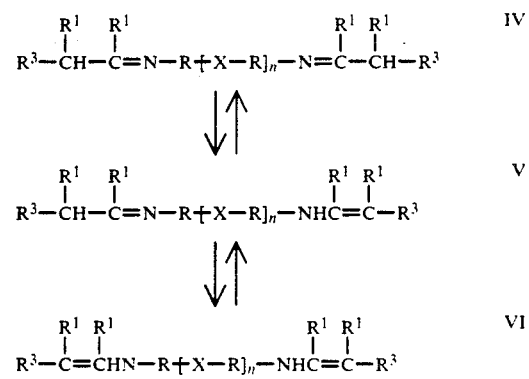

wherein R, $R^1$, X, and n are as defined above, and $R^3$ is hydrogen or a $C_{1-20}$ alkyl. Preferably two R1 groups are connected to form a cyclic ring.

In its fifth aspect, this invention is an isocyanate-functional prepolymer which comprises the reaction product of
(1) a secondary amine comprising
  a backbone portion containing a plurality of polyalkyleneoxy moieties and one or more internal urea, thiourea, biuret, thiobiuret, amide, or thioamide moieties, and
  a plurality of secondary amino end groups, wherein each amino end group is separated from a urea, thiourea, biuret, dithiobiuret, amide, or thioamide moiety by at least one alkylene, cycloalkylene, aralkylene, arylene, alkyleneoxy, or polyalkyleneoxy moiety with 4-20 carbon atoms with
(2) a polyisocyanate.

The polyisocyanates suitable for making the novel compositions of this invention include aliphatic, cycloaliphatic, araliphatic, aromatic and heterocyclic polyisocyanates. Specific examples include ethylene diisocyanate, 1,4-tetramethylene diisocyanate, 1,6-hexamethylene diisocyanate, 1,12-dodecane diisocyanate, cyclobutane-1,3-diisocyanate, cyclohexane-1,3- and 1,4-diisocyanate and mixtures of these isomers; 1-isocyanato-3,3,5-trimethyl-5-isocyanato methyl cyclohexane (see e.g., German Auslegeschrift No. 1,202,785); 2,4- and 2,6-hexahydrotolylene diisocyanate and mixtures of these isomers, hexahydro-1,3- and/or 1,4-phenylene diisocyanate, perhydro-2,5'- and/or 4,4'-diphenyl methane diisocyanate, 1,3- and 1,4-phenylene diisocyanate, 2,4- and 2,6-tolylene diisocyanate and mixtures of these isomers, diphenyl methane-2,4'- and/or 4,4'-diisocyanate, naphthylene-1,5-diisocyanate, triphenyl methane-4,4',4"-triisocyanate, polyphenyl polymethylene polyisocyanates of the type obtained by condensing aniline with formaldehyde, followed by phosgenation and such as described for example in British Patents 874,430 and 848,671, perchlorinated aryl polyisocyanates of the type described in German Auslegeschrift 1,157,601, polyisocyanates containing carbodiimide groups of the type described in German Patent 1,092,007, diisocyanates of the type described in U.S.

Pat. No. 3,492,330, polyisocyanates containing allophanate groups of the type described, for example, in British Patent 994,890, in Belgian Patent 761,626 and in published Dutch Patent Application No. 7,102,524, polyisocyanates containing isocyanurate groups of the type described in German Patents 1,022,789; 1,222,067 and 1,027,394 and in German Offenlegungsschrift 1,929,034 and 2,004,048, polyisocyanates containing urethane groups of the type described, for example, in Belgian Patent 752,261 or in U.S. Pat. No. 3,394,164, polyisocyanates containing acrylated urea groups as described in German Patent 1,230,778, polyisocyanates containing biuret groups of the type described, for example, in German Patent 1,101,392, in British Patent 889,050 and in French Patent 7,017,514, polyisocyanates obtained by telomerization reactions of the type described, for example, in Belgian Patent 723,640, polyisocyanates containing ester groups of the type described, for example, in British Patents 965,474 and 1,072,956, in U.S. Pat. No. 3,567,763 and in German Patent 1,231,688 and reaction products of the aforementioned isocyanates with acetals as described in German Patent 1,072,385.

In addition, derivatives of 4,4'-diphenylmethane diisocyanate which are liquid at room temperature such as, for example, polyisocyanates which have carbodiimide groups in their backbone or mixtures thereof may also be used. The preparation of these materials is disclosed in U.S. Pat. No. 3,152,162, which is hereby incorporated by reference in its entirety. An example of a commercial material of this type is Isonate TM 143L Isocyanate, a product of The Dow Chemical Company.

It is also possible to use the distillation residues containing isocyanate groups accumulating in the commercial production of isocyanates, optionally in solution in one or more of the aforementioned polyisocyanates. In addition, it is possible to use mixtures of the aforementioned polyisocyanates.

Additional polyisocyanates suitable for use in this invention include those described by W. Siefken in *Justus Liebigs Annalen der Chemie*, 562, pp. 75–136, and in U.S. Pat. Nos. 3,284,479; 4,089,835; 4,093,569; 4,221,876; 4,310,448; 4,359,550 and 4,495,309.

One class of particularly useful polyisocyanates are the aromatic polyisocyanates such as 2,4- and 2,6-tolylene diisocyanates and mixtures of these isomers ("TDI"), polyphenyl-polymethylene polyisocyanates of the type obtained by condensing aniline with formaldehyde, followed by phosgenation ("crude MDI") and, polyisocyanates containing carbodiimide groups, urethane groups, allophanate groups, isocyanurate groups, urea groups or biuret groups ("modified polyisocyanates").

A preferred class of aromatic polyisocyanates is methylene bis(4-phenylisocyanate) or MDI. Pure MDI, quasi- and prepolymers of MDI, modified pure MDI, etc. Materials of this type may be used to prepare suitable RIM elastomers. Since pure MDI is a solid and, thus, often inconvenient to use, liquid products based on MDI are often used and are included in the scope of the terms MDI or methylene bis(4-phenylisocyanate) used herein. U.S. Pat. No. 3,394,164 is an example of a liquid MDI product. More generally uretonimine modified pure MDI is included also. This product is made by heating pure distilled MDI in the presence of a catalyst.

In the preparation of such prepolymers, excess isocyanate can be added to the polyamine or the polyamine can be added to excess isocyanate. Preferably, the polyamine is added to excess isocyanate under conditions which are well-known for the reaction of polyisocyanates with prior art polyahls. Examples of such conditions are described in U.S. Pat. Nos. 4,108,842; 4,125,522 and 4,476,292, the relevant portions of which are hereby incorporated by reference. In addition, the isocyanates useful for making the prepolymers of the invention may also be prepolymers of a variety of polyahls such as polyether polyols, polyester polyahls, polyamines, and aminoalcohols, which are formed by reacting a polyahl with a polyisocyanate.

The viscosity of the secondary amine increased with increasing number of urea, thiourea, biuret, dithiobiuret, thioamide and/or amide moieties in the polyamine backbone and with increasing molecular weight of the polyamine. This increased viscosity in the polyamine results in increased viscosity in the corresponding isocyanate functional prepolymer. This requires corresponding increases in the reaction temperature during prepolymer formation. Temperatures of 70° C. to 110° C. or even higher are required as the polyamine and/or prepolymer viscosity increases. At the higher temperatures, prepolymer stability is sometimes reduced and chain extension of the prepolymer to the corresponding polymer needs to be carried out more quickly. The presence of mildly acidic prepolymer stabilizers, such as benzoyl chloride, can be useful. In some cases an inert solvent, such as dimethylsulfoxide, dimethylformamide or dimethylacetamide, is used to reduce the viscosity of the polyamine and the corresponding prepolymer. A chain extender can be added to the prepolymer solution and the resultant polymer separated. Under some circumstances the polymer is soluble in the inert solvent and in other circumstances the polymer is insoluble in the prepolymer solvent. When the polymer is soluble it can be cast as a film from solution or it can be precipitated by the addition of a poor solvent or it can be obtained by removal of the solvent. It is preferably to make and use the isocyanate-functional prepolymer in the absence of a solvent.

It is further understood that such prepolymers of this invention may also be prepared by the reaction of the urea/biuret/thiourea/dithiobiuret/thioamide/amide/urethane/thiourethane secondary amine and a polyahl as a mixture with excess polyisocyanate. This is another way to reduce the viscosity of the prepolymer and thereby facilitate its handling. In such prepolymers, the urea/biuret/thiourea/dithiobiuret/thioamide/amide polyamine:polyahl mole ratio is in the range from about 20:1 to about 0.05:1, most preferably from about 10:1 to about 0.1:1. These mixed amine polyahl prepolymers are also isocyanate-functional and are prepared using conditions known in the prior art as cited hereinbefore. Polyether polyamines are a preferred class of polyamines useful as the polyahls in making such prepolymers.

In a sixth aspect, this invention is a novel urethane and/or urea polymer formed by the reactions of the aforementioned isocyanate-functional prepolymer of this invention with a polyahl or mixtures of polyahls. The term "polyahl" as used herein includes any organic compound having at least two active hydrogen moieties wherein the compound has a number average molecular weight ($\overline{M}_n$) of at least 62. Preferably, the polyahl is a polymer having a $\overline{M}_n$ of at least 200 and at least three repeating units of a monomeric moiety. For the purposes of this invention, an active hydrogen moiety refers to a moiety containing a hydrogen atom which, because of its position in the molecule, displays significant activity according to the Zerewitinoff test described by Wöhler in the *Journal of the American Chemical Society*, Vol. 49, p.3181 (1927). Illustrative of such active hydrogen moieties are —COOH, —OH, —NH$_2$, —NH—, —CONH$_2$, —SH, and —CONH—. Typical polyahls include polyols, polyamines, polyamides, polymercaptans and polyacids. Many such polyahls of a lower molecular weight are commonly called chain-extenders when used with isocyanate-functional prepolymers and are optionally employed with catalysts and a variety of other additives. High molecular weight polyahls can also be used.

The chain-extenders useful to make the compositions of this invention are preferably difunctional. Mixtures of difunctional and trifunctional chain-extenders are also useful in this invention. The chain-extenders useful in this invention include diols, amino alcohols, diamines or mixtures thereof. Low molecular weight linear diols such as 1,4-butanediol and ethylene glycol have been found suitable for use in this invention. Other chain-extenders including cyclic diols such as 1,4-cyclohexanediol and 1,4-cyclohexanedimethanol; aromatic ring-containing diols such as bishydroxyethylhydroquinone; amide- or ester-containing diols or amino alcohols are useful. Aromatic diamines and aliphatic diamines are suitable chain-extenders. Examples include ethylenediamines, 1-(2-aminoisopropyl-4-methyl-4-aminocyclohexane), 1,2-propanediamine, 1,4-butanediamine; 1,6-hexanediamine, diethyltoluenediamine and 1,4-bis-(aminomethyl)cyclohexane. Additional examples of useful chain-extenders can be found in U.S. Pat. Nos. 4,297,444; 4,202,957; 4,476,292; 4,495,309 and 4,218,543.

Catalyst such as tertiary amines or an organic tin compound or other polyurethane catalyst may be used. The organic tin compound may suitably be a stannous or stannic compound, such as stannous salt of a carboxylic acid, a trialkyltin oxide, a dialkyltin dihalide, a dialkyltin oxide, etc., wherein the organic groups of the organic portion of the tin compound are hydrocarbon groups containing from 1 to 18 carbon atoms. For example, dibutyltin dilaurate, dibutyltin diacetate, diethyltin diacetate, dihexyltin diacetate, di-2-ethylhexyltin oxide, dioctyltin dioxide, stannous octoate, stannous oleate, etc., or a mixture thereof, may be used. Other catalyst include organo zinc, mercury and lead compounds. For some polymers, a catalyst is not needed.

Tertiary amine catalyst include trialkyamines (e.g., trimethylamine, triethylamine), heterocyclic amines, such as N-alkylmorpholines (e.g., N-methylmorpholine, N-ethylmorpholine, dimethyldiaminodiethyl ether, etc.), 1,4-dimethylpiperazine, triethylenediamine, etc., and aliphatic polyamines, such as N,N,N',N'-tetramethyl-1,3-butanediamine.

Optional additives include anti-foaming agents such as glycerine, an ethyl acrylate-2-ethylhexyl acrylate copolymer, dimethyl siloxane copolymers and silicones; antioxidants such as esters of β-(3,5-di-tert-butyl-4-hydroxyphenyl) propionic acid with monohydric or polyhydric alcohols, for example, methanol, octadecanol, 1,6-hexanediol, neopentyl glycol, thiodiethylene glycol, diethylene glycol, triethylene glycol, pentaerythritol, tris-hydroxyethyl isocyanurate, and dihydroxyethyl oxalic acid diamine; UV absorbers and light stabilizers such as 2-(2'-hydroxyphenyl)benzotriazoles and sterically hindered amines such as bis-(2,2,6,6-tetramethylpiperidyl-sebacate, bis-(1,2,2,6,6-pentamethylpiperidyl)-sebacate, n-butyl-3,5-di-tert-butyl-4-hydroxybenzyl malonic acid, bis-(2,2,6,6-pentamethylpiperidyl)ester, condensation product of 1-hydroxyethyl-2,2,6,6-tetramethyl-4-hydroxypiperidine and succinic acid, condensation product of N,N'-(2,2,6,6-tetramethylpiperidyl)-hexamethylene diamine and 4-tert-octylamino-2,6-dichloro-1,3,5-s-triazine, tris(2,2,6,6-tetramethylpiperidyl)-nitrilotriacetate, tetrakis-(2,2,6,6-tetramethyl-4-piperidyl)-1,2,3,4-butane-tetracarbonic acid and 1,1'-(1,2-ethanediyl)-bis-(3,3,5,5-tetramethylpiperazinone); plasticizers such as phthalates, adipates, glutarates, epoxidized vegetable oils, and the like, fungicides; pigments; dyes; reactive dyes; moisture scavengers; and the like. In addition, fillers and reinforcing materials such as chopped or milled glass fibers, chopped or milled carbon fibers and/or other mineral fibers are useful.

Approximately stoichiometric amounts of the isocyanate moieties of the isocyanate-functional prepolymers of this invention and the active hydrogen moieties on the polyahls are used. The equivalent ratio of isocyanate moieties to total active hydrogen moieties is between about 0.95:1.00 to 1.00:1.05, more preferred is an isocyanate:polyahl equivalent ratio of from 0.97:1.00 to 1.00:1.03, most preferred is a ratio of 1.00:1.00 to 1.00:1.03.

In a seventh aspect, this invention is a novel urethane/urea polymer formed by the reaction of the urea/biuret/thiourea/dithiobiuret/thioamide/amide polyamine with a polyisocyanate as defined hereinbefore. Such urethane/urea polymers are optionally prepared in the presence of other polyahls as defined hereinbefore and catalysts and other additives used conventionally to prepare urethane and urea polymers. For some polymers a catalyst is not needed.

Approximately stoichiometric amounts of the isocyanate moieties of the polyisocyanates and the total active hydrogen moieties on the urea/biuret/thiourea/amide polyamine and other polyahls, if employed, are used. The equivalent ratio of isocyanate moieties to total active hydrogen moieties is between about 0.90:1.00 to 1.00:1.25; more preferred is an isocyanate:active hydrogen equivalent ratio of from 0.95:1.00 to 1.00:1.15, most preferred is a ratio of 0.98:1.00 to 1.00:1.05. The preparation of urethane/urea polymers is well-known in the art. Examples of typical reaction conditions employed can be found in U.S. Pat. Nos. 4,460,715 and 4,394,491, the relevant portions of which are hereby incorporated by reference.

The polymers of the present invention can be fabricated by any fabrication technique known in the art. Useful processes include hand casting (see, for example, U.S. Pat. No. 4,476,292) and reaction injection molding (see, for example, U.S. Pat. Nos. 4,297,444 and 4,495,309).

Reaction injection molding (RIM) is a preferred fabrication technique. The relatively high viscosities of the urea/biuret/thiourea/dithiobiuret/thioamide/amide polyamines are readily reduced by heating. This is easily accomplished in RIM equipment by heating the tank and lines. Viscosity is also reduced by blending with chain-extending agents and, optionally, with other polyahls. The urethane/urea polymers of this invention are useful in automotive body panel applications or automotive fascia.

In its eighth aspect, this invention is a urethane/urea polymer which has been post-cured by heating the urethane/urea polymer that forms the fourth or fifth aspect of this invention to a temperature in the range from about 175° C. to about 200° C. for a period from about 1 to about 12 hours or more. To prevent degradation, it is preferred to carry out the post-curing process in an inert atmosphere, such as nitrogen, when using higher temperatures or longer heating periods. As a result of this post-cure, the properties such as toughness and tensile strength of the resultant polymer are noticeably improved.

In its ninth, tenth, and eleventh aspects, the invention is a prepolymer prepared from the imine of the invention, a polymer prepared from such a prepolymer, and a polymer prepared from the imine of the invention and an isocyanate, preferably in the presence of additional polyahls, respectively. These prepolymers and polymers may be prepared using the same methods as described above for preparing prepolymers and polymers from secondary amines. Preferably, a ketone is used to prepare the imine starting materials, which is more preferably cyclohexanone or cyclopentanone.

In its twelfth aspect, the invention is a composition comprising an epoxy resin and the imine of the first aspect of the invention or the secondary amine of the second aspect of the invention, or a mixture thereof, wherein the imine or secondary amine is present in an amount effective to extend and/or cure the epoxy resin. The imine, secondary amine, or mixture thereof may be employed as a chain extender or curing agent for a material having a plurality of oxiranyl moieties, herein called an epoxy resin. Preferably, the chain extender or curing agent is a ketimine. Preferably, the molar ratio of epoxy resin to imine, secondary amine, or mixture thereof is least about 1:10, more preferably at least about 1:3, and most preferably at least about 1:2; and is preferably no greater than about 10:1, more preferably no greater than about 3:1, and most preferably no greater than about 2:1.

Examples of suitable epoxy reins are described in U.S. Pat. Nos. 4,783,363; 3,397,254; H. Lee and K. Neville, *Handbook of Epoxy Resins*, McGraw Hill Book Co., Ch. 9 (1967); and *Epoxy Resins, Chemistry and Technology*, edited by C. A. May and Y. Tanaka, Marcel Dekker (1973) which are hereby incorporated by reference. Of these epoxy resins, the polyglycidyl ethers of bisphenolic compounds and trisphenolic compounds as well as advanced derivatives thereof are preferred, with the polyglycidyl ethers of tris(hydroxyphenyl)methane and bisphenol-A and their advanced derivatives being most preferred. The procedures for using secondary amines as chain extenders or curing agents for epoxy agents are generally described H. Lee and K. Neville, *Handbook of Epoxy Resins*, McGraw Hill Book Co., Ch. 9 (1967), which is hereby incorporated by reference and are more specifically illustrated hereinafter in Examples 36-38. The cured epoxy resins prepared using the polyamines of this invention exhibit substantially increased toughness over those prepared using conventional polyamines.

ILLUSTRATIVE EMBODIMENTS

The following examples are given to illustrate the invention and should not be interpreted as limiting it in any way. Unless stated otherwise, all parts and percentages are given by weight. The Brookfield viscosities reported in the following examples are all measured at ambient temperatures (25° C.) using a LV 4 spindle at an appropriate spin rate listed in each example.

EXAMPLE 1

Preparation of a Secondary Amine Containing Urea Moieties in Its Backbone

Preparation of a Diamine Containing about Three Urea Moieties per Average Molecule; Molecular Weight = 1964

A primary, aliphatic diamine containing about three urea moieties per average backbone molecule is prepared by reacting Jeffamine ™ D-400 (3367.6 g, 7.514 moles), an aminated poly(propylene glycol) of 448 number average molecular weight, a product of Texaco) with urea (347.1 g, 5.780 moles), D-400:urea molar ratio = 1.30:1) in a 5-liter, 3-necked flask equipped with a thermometer, overhead stirrer, condenser, temperature control system and maintained under a nitrogen atmosphere. The contents of the flask are heated at 150° C. for 24 hours. The ammonia formed during the reaction is directed into an aqueous scrubber. The reactor is then cooled to ambient temperature and treated on a rotary evaporator at 90° C. under a 20 mm Hg vacuum for 3 hours. The product is a light yellow, viscous liquid with the following properties: basicity, 1.109 meq/g; molecular weight by end group titration, 1964; 3.19 urea moieties/molecule per perchloric acid titration; Brookfield viscosity, 41,000 cps at 25° C.

Preparation of the N-Isopropyl End Group Derivative Using a PtO$_2$ Catalyst System at 325 psig Pressure A portion of the product as prepared above (100 g) dissolved in acetone (12 g) to form am imine and PtO$_2$ powder (1.0 g, Alfa) is weighed into a 300-ml stirred reactor (Autoclave Engineers) in a nitrogen atmosphere. The reactor is pressurized with 325 psi hydrogen gas and heated as shown in Table I with an agitator speed of 1600 rpm. After Sample 3, additional acetone (14 g) is added and the H$_2$ pressure is increased to 400 psi. After Sample 5, the H$_2$ pressure is again increased to 425 psi. Additional acetone (15 g) and H$_2$ (475 psi) are added after Sample 6. More acetone (18 g) and H$_2$ (600 psi) are added after Sample 7. The product is analyzed at various times and temperatures (see Table I).

TABLE I

| Sample | Conditions | Mole Weight | Urea Moieties per Molecule | Carbon-13 NMR Assay* Primary Amine | Secondary Amine | Imine |
|---|---|---|---|---|---|---|
| 1 | starting material | 1964 | 3.19 | — | — | — |
| 2 | 4 hr at 125° C. | 2014 | 3.22 | nd | nd | nd |
| 3 | +4 hr at 140° C. | 2028 | 3.22 | nd | nd | nd |
| 4 | +4 hr at 140° C. | 2060 | 3.26 | nd | nd | nd |
| 5 | +4 hr at 140° C. | 2034 | 3.20 | 29 | 66 | 5 |
| 6 | +4 hr at 150° C. | 1999 | 3.10 | 27 | 73 | 0 |
| 7 | +7 hr at 150° C. | 1912 | 2.87 | 4 | 96 | 0 |

TABLE I-continued

| Sample | Conditions | Mole Weight | Urea Moieties per Molecule | Carbon-13 NMR Assay* | | |
|---|---|---|---|---|---|---|
| | | | | Primary Amine | Secondary Amine | Imine |
| 8 | +7 hr at 150° C. | 1798 | 2.58 | 2 | 98 | 0 |

*Mole percent; nd = not determined

EXAMPLE 2

Preparation of a Secondary Amine Using a PtO₂ Catalyst System at 400 psig Pressure A portion of the primary diamine containing three urea moieties per molecule prepared in Example 1 (80 g) is dissolved in acetone (30 g) to form an imine and subjected to the same reactor set up used in Example 1. The following reaction parameters are employed: 1.0 g of PtO₂ catalyst, 150° C. reactor temperature, 400 psig H₂ pressure and 25 hours total reaction time. The product is analyzed at various times and temperatures (see Table II).

TABLE II

| Sample | Conditions | Mole Weight | Urea Moieties per Molecule | Carbon-13 NMR Assay* | | | grams of Additional Acetone Added |
|---|---|---|---|---|---|---|---|
| | | | | Primary Amine | Secondary Amine | Imine | |
| 1 | starting material | 1964 | 3.19 | — | — | — | |
| 2 | 7 hr at 150° C. | 2092 | 3.31 | 30 | 48 | 22 | 16 |
| 3 | 13 hr at 150° C. | 2090 | 3.23 | 13 | 70 | 17 | 20 |
| 4 | 19 hr at 150° C. | 1989 | 3.04 | 9 | 76 | 15 | 20 |
| 5 | 25 hr at 150° C. | 1730 | 2.51 | 5 | 95 | 0 | |

*Mole percent

EXAMPLE 3

Preparation of a Secondary Amine Using a Pd/C and PdO₂ Mixed Catalyst System A portion of the primary diamine containing three urea moieties per molecule prepared in Example 1 (103.2 g) is dissolved in acetone (30 g) to form an imine and subjected to the same reactor set up used in Example 2. The following reaction parameters are employed: 3.0 g of Pd/C and 3.0 g of PdO mixed catalyst, 150° C. reactor temperature, 420 psig H₂ pressure, and 7 hours reaction time. The product is stripped of acetone in a rotary evaporator (140° C.) and analyzed (see Table III).

TABLE III

| Sample | Conditions | Mole Weight | Urea Moieties per Molecule | Carbon-13 NMR Assay* | | |
|---|---|---|---|---|---|---|
| | | | | Primary Amine | Secondary Amine | Imine |
| 1 | starting material | 1964 | 3.19 | — | — | — |
| 2 | 7 hr at 150° C. | 1901 | 2.87 | 0 | 100 | 0 |

*Mole percent

EXAMPLE 4

Preparation of a Secondary Amine Using a Mixed Catalyst System at 940-1100 psi Pressure A portion of the primary diamine containing three urea moieties per molecule prepared in Example 1 is dissolved in acetone (11.5 weight percent) to form an imine, and pumped over a fixed catalyst bed. The bed consists of 2 tubes in series. Tube 1 is 36" in length by 0.87" I.D. and contains 218 g of 4×8 mesh 0.3 percent Palladium-on-carbon catalyst (Girdler C-75c). Tube 2 is 16" in length by 0.87" I.D. and contains 250 g of 0.3 percent platinum-0.3 percent palladium/one-eighth inch Al₂O₃ pellets (Engelhard lot 118-7-2-112). The imine feed rate is 0.17 lb/hr while the catalyst temperature is between 100° C.-130° C. and the reactor pressure is 940-1100 psi. Hydrogen is added at a 70-100 cc/min flow rate. The product is stripped of volatiles in a rotary evaporator (125° C.) followed by analysis by carbon-13 NMR and size exclusion chromatography. The results are shown in Table IV.

TABLE IV

| Sample | Conditions | Mole Weight | Urea Moieties per Molecule | Carbon-13 NMR Assay* | | |
|---|---|---|---|---|---|---|
| | | | | Primary Amine | Secondary Amine | Imine |
| 1 | starting material | 2510 | 4.47 | — | — | — |
| 2 | 4 hr | 1532 | 2.16 | 2 | 98 | 0 |

*Mole percent

EXAMPLE 5

Preparation of a Secondary Amine Using a Mixed Catalyst System at 750-1100 psi Pressure Using a procedure similar to Example 4, the same imine mixture is passed over the catalyst bed at 100° C.-130° C. and 750-1100 psi reactor pressure with a feed rate of 0.14 lb/hr and a hydrogen flow rate of 25-60 cc/min. Product clean up was similar to Example 4 and the analysis is presented in Table V.

TABLE V

| Sample | Conditions | Mole Weight | Urea Moieties per Molecule | Carbon-13 NMR Assay* | | |
|---|---|---|---|---|---|---|
| | | | | Primary Amine | Secondary Amine | Imine |
| 1 | starting material | 2510 | 4.47 | — | — | — |
| 2 | 6 hr | 1296 | 1.71 | 2 | 97 | 1 |

*Mole percent

EXAMPLE 6

Preparation of a Secondary Amine Containing Amide Moieties in its Backbone

Preparation of a Diamine Containing about Six Amide Moieties per Average Molecule and Based on Adipic Acid; Molecular Weight=2619

A primary aliphatic diamine containing about six amide moieties per average backbone molecule is prepared by reacting Jeffamine TM D-400 (2981.7 g, 6.988 moles) with adipic acid (785.5 g, 5.375 moles; D-400:adipic acid molar ratio=1.30:1) using the same reactor set up used in Example 1, except a Dean-Stark trap is located between the reactor and the condenser. The contents of the flask are heated at 130° C. for 1 hour to form the corresponding amine salt. Toluene (250 ml) is added and the water formed during the reaction is removed in the trap. The bulk of the toluene is removed from the trap by continued heating until a pot temperature of 190° C. is reached. The reactor is then cooled to ambient temperature and treated on a rotary evaporator at 90° C. under a 10 mm Hg vacuum for 5 hours. The product is a light yellow, viscous liquid with the following properties: basicity, 0.764 meq/g; molecular weight by end group titration, 2619; Brookfield viscosity, 63,500 cps at 25° C.

Preparation of the N-Isopropyl End Group Derivative Using a Pt/Al$_2$O$_3$ Catalyst System A portion of the primary diamine prepared above is dissolved in 25 percent excess of acetone over the stoichiometric amount to form an imine. This is pumped over a fixed bed consisting of a stainless steel tube 15' long by 0.87" I.D. filled with 1 percent Pt/Al$_2$O$_3$ catalyst of one-eighth inch pellets. The total catalyst weight is 1438 g. At a temperature of 150° C., the reactant flow rate is 0.3 lb/hr with 750 cc/min H$_2$ gas added at a system pressure of 450 psi. The product is stripped of acetone on a falling film still (120° C.) and analyzed: basicity, 0.693 meq/g; molecular weight by end group titration, 2886; essentially no backbone degradation by SEC; no imine and essentially all secondary amine by carbon-13 NMR.

EXAMPLE 7

Preparation of a Secondary Diamine Containing Amide Moieties in its Backbone

Preparation of a Primary Diamine Containing about Six Amide Moieties per Average Molecular and Based on Adipic Acid; Molecular Weight=8624

A primary, aliphatic diamine containing about six amide moieties per average backbone molecule is prepared by reacting Jeffamine TM D-2000 (3175.5 g, 1.566 moles; an aminated poly(propylene glycol) of 2028 number average molecular weight, a product of Texaco) with adipic acid (176.0 g, 1.205 moles; D-2000:adipic acid molar ratio=1.30:1) using the same reactor set up used in Example 6. The contents of the flask are heated at 130° C. for 1 hour to form the corresponding amine salt. Toluene (250 ml) is added and the water formed during the reaction is removed in the trap. The bulk of the toluene is removed from the trap by continued heating until a pot temperature of 190° C. is reached. The reactor is then cooled to ambient temperature and treated on a rotary evaporator at 90° C. under a 10 mm Hg vacuum for 5 hours. The product is a light yellow, viscous liquid with the following properties: basicity, 0.232 meq/g; molecular weight by end group titration, 8624; Brookfield viscosity, 16,080 cps at 25° C.

Preparation of a Secondary Amine Using a Pt/Al$_2$O$_3$ Catalyst System

The primary diamine prepared above is dissolved in acetone (25 weight percent) to form an imine and subjected to the same reactor set up used in Example 6. The following reaction parameters are employed: Pt/Al$_2$O$_3$ catalyst, 152° C. reactor temperature, 450 psig pressure, 740 cc/;min H$_2$ flow rate, and 0.28 lb/hr imine feed rate. The product is stripped of acetone on a falling film still (120° C.) and analyzed; basicity, 0.221 meq/g; molecular weight by end group titration, 9060; essentially no backbone degradation by SEC; no imine and essentially all secondary amine by carbon-13 NMR.

EXAMPLE 8

Preparation of a Polymer Based on the Secondary Amine of Example 6; Mold Temperature=100° C.

A small scale reaction injection molding (RIM) machine is used to fabricate parts suitable for physical property testing. The machine consists of two chemical tanks (1.5 liter volume) and a pumping system capable of dispensing precise quantities of each component into a mixhead where the components are rapidly mixed and sent through an aftermixer into a heated mold (4"×8"×0.125"). The following machine conditions are employed: component delivery pressure, 2000 psig (A and B side); throughput, 35 lb/min; harp aftermixer; mold temperature, 100° C.; demold time, 60 sec; A-side temperature, 38° C.-42° C.; B-side temperature, 75° C.-84° C.

A formulation is employed in which Isonate TM 143L (a methylene(diphenyldiisocyanate) which contains about 15 percent dimer and a small amount of highers; a product manufactured by The Dow Chemical Company) is used on the S side and a blend of the product of Example 6 (912.1 g) and diethyltoluenediamine (587.9 g) is used on the B side. An A:B weight ratio of 0.721 is used to produce 60 volume percent hard segment parts at an index of 1.03. The parts have very good green strength at demold. A series of well mixed parts are obtained having useful physical properties as shown hereinbelow.

EXAMPLE 9

Preparation of a Polymer Based on a 90/10 Weight Blend of a 2000 Molecular Weight Diamine Containing N-Isopropyl End Groups and the Amide Modified Diamine Containing N-Isopropyl End Groups of Example 6; Mold Temperature = 100° C.

The same small scale RIM equipment is used that was used in Example 8. The following machine conditions are employed: component delivery pressure, 2000 psig (A and B side); throughput, 35 lb/min; harp aftermixer; mold temperature, 100° C.; demold time, 60 sec; A side temperature, 45° C.–48°°C.; B side temperature, 82° C.–88° C.

A formulation is employed in which Isonate TM 143L is used on the A side and a blend of Jeffamine TM D-2000 which has previously been converted to its N-isopropyl derivative (827.7 g; 2081 number average molecular weight), the product of Example 6 (92.0 g) and diethyltoluenediamine (580.3 g) is used on the B side. An A:B weight ratio of 0.735 is used to produce 60 volume percent hard segment parts at an index of 1.03. The parts have extremely poor green strength and shatter into many pieces in the mold.

EXAMPLE 10

Preparation of a Polymer Based on a 90/10 Weight Blend of a 2000 Molecular Weight Diamine Containing N-Isopropyl End Groups and the Amine Modified Diamine Containing N-Isopropyl End Groups of Example 6; Mold Temperature = 120° C.

Example 9 is repeated using a mold temperature of 120° C. The green strength of the parts at demold is improved considerably. However, crack free parts could not be made.

EXAMPLE 11

Preparation of a Polymer Based on a 90/10 Weight Blend of a 2000 Molecular Weight Diamine Containing N-Isopropyl End Groups and the Amide Modified Diamine Containing N-Isopropyl End Groups of Example 6; Mold Temperature = 140°C.

Example 9 is repeated using a mold temperature of 140° C. The parts have good green strength at demold. A series of well mixed parts are obtained having useful physical properties as shown hereinbelow.

COMPARATIVE EXAMPLE 1

Preparation of a Polymer Based on a 2000 Molecular Weight Diamine Containing N-Isopropyl End Groups; Mold Temperature = 140° C.

The same small scale RIM equipment is used that was used in Example 8. The following machine conditions are employed: component delivery pressure, 2000 psig (A and B side); throughput, 35 lb/min; harp aftermixer; mold temperature; 140° C.; demold time, 60 sec; A side temperature, 30° C.–35° C.; B side temperature, 57° C.–64° C.

A formulation is employed in which Isonate TM 143L is used on the A side and a blend of Jeffamine TM D-2000 which has previously been converted to its N-isopropyl derivative (923.4 g; 2081 number average molecular weight) and diethyltoluenediamine (576.6 g) is used on the B side. An A:B weight ratio of 0.742 is used to produce 60 volume percent hard segment parts at an index of 1.03. The parts have extremely poor green strength and crack into many pieces in the mold.

COMPARATIVE EXAMPLE 2

Preparation of a Polymer Based on a 2000 Molecular Weight Diamine Containing N-Isopropyl End Groups; Mold Temperature = 165° C.

Comparative Example 1 is repeated using a mold temperature of 165° C. The parts have fair green strength at demold. However, most parts contained some cracks. A series of well mixed parts are obtained having useful physical properties as shown hereinbelow.

EXAMPLE 12

Preparation of a Polymer Based on the Amine Modified Diamine Containing N-Isopropyl End Groups of Example 16; Mold Temperature = 165° C.

The same small scale RIM equipment is used that was used in Example 8. The following machine conditions are employed: component delivery pressure, 2000 psig (A and B side); throughput, 35 lb/min; harp aftermixer; mold temperature, 165° C.; demold time, 60 sec; A side temperature, 40° C.–42° C.; B side temperature, 77° C.–82° C.

A formulation is employed in which Isonate TM 143L is used on the A side and a blend of the product of Example 7 (914.5 g) and diethyltoluenediamine (585.5 g) is used on the B side. An A:B weight ratio of 0.725 is used to produce 60 volume percent hard segment parts at an index of 1.03. The parts have good green strength at demold. A series of well mixed parts are obtained having useful physical properties as shown hereinbelow.

EXAMPLE 13

Preparation of a Polymer Based on the Urea Modified Diamine Containing N-Isopropyl End Groups of Example 20; Mold Temperature = 100° C.

The same small scale RIM equipment is used that was used in Example 8. The following machine conditions are employed; component delivery pressure, 2000 psig (A and B side); throughput, 35 lb/min; harp aftermixer; mold temperature, 100° C.; demold time, 60 sec; A side temperature, 39° C.–44° C.; B side temperature, 70° C.–77° C.

A formulation is employed in which Isonate TM 143L is used on the A side and a blend of the product of Example 4 (931.4 g) and diethyltoluenediamine (568.6 g) is used on the B side. An A:B weight ratio of 0.757 is used to produce 60 volume percent hard segment parts at an index of 1.03. The parts have good green strength at demold. A series of well mixed parts are obtained having useful physical properties as shown hereinbelow.

EXAMPLE 14

Measurement of Physical Properties

Plaques are cured for two weeks at ambient temperature or selected plaques are post cured for 1 hour at 175° C. prior to physical testing. Selected physical properties are given in Tables VI–IX hereinbelow.

Properties are compared relative to Jeffamine TM D-2000 which had been converted to N-isopropyl end groups, since this material has the same polypropyleneoxy backbone, the same aliphatic secondary amino end groups and approximately the same molecular weight as many of the novel compositions of this invention.

Table VI shows that only fair green strength is attained using the control (no hydrogen bonding moieties in the backbone of the soft segment) even at a 165° C. mold temperature. If, however, only 10 weight percent of the control is replaced with the diamine containing amide moieties in its backbone (diamine of Example 6), processability is improved and good green strength is possible at a mold temperature of only 140° C. If 100 percent of the control is replaced with the diamine containing amide moieties in its backbone (diamine of Example 6), processability is greatly improved and very good green strength is possible at only a 100° C. mold temperature. The higher molecular weight diamine containing amide moieties in its backbone (diamine of Example 7), processability is better than the control at 165° C. If 100 percent of the control is replaced with the diamine containing urea moieties in its backbone (diamine of Example 4), processability is greatly improved and very good green strength is possible at only a 100° C. mold temperature. Table VII shows that modulus and hardness are improved relative to the control by using these novel polyamines. Plaques from Example 12 have a much lower density of hydrogen bonding moieties in the soft segment backbone and therefore have a lower modulus and hardness. Table VIII shows there is a considerable enhancement in toluene and methylethylketone solvent resistance when using the novel backbone modified diamines. Water and methanol solvent resistance does not change much. Plaques from Example 12 have a much lower density of hydrogen bonding moieties in the soft segment backbone and therefore have a lower resistance to the solvents studied. Table IX shows that impact properties are reduced.

TABLE VI

Green Strength RIM Processability

| Diamine from Example | Plaque from Example | Weight Ratio of Modified/Unmodified Diamine | Mold Temperature | Green Strength |
|---|---|---|---|---|
| Comp. Ex. 1 | Comp. Ex. 1 | 100% unmodified | 140° C. | extremely poor |
| Comp. Ex. 1 | Comp. Ex. 2 | 100% unmodified | 165° C. | fair |
| 6 | 9 | 10% amide-modified | 100° C. | extremely poor |
| 6 | 10 | 10% amide-modified | 120° C. | poor |
| 6 | 11 | 10% amide-modified | 140° C. | good |
| 6 | 8 | 100% amide-modified | 100° C. | very good |
| 7 | 12 | 100% amide-modified | 165° C. | good |
| 4 | 13 | 100% urea-modified | 100° C. | very good |

TABLE VII

Modulus and Hardness Properties

| Diamine from Example | Plaque from Example | Weight Ratio of Modified/Unmodified Diamine | Hardness[1] (Shore D) | Youngs Modulus[2] | Flexural Modulus[3] |
|---|---|---|---|---|---|
| Comp. Ex. 1 | Comp. Ex. 2 | 100% unmodified | 59 | 180,000 | 162,000 |
| 6 | 11 | 10% amide-modified | 61 | 210,000 | 226,000 |
| 6 | 8 | 100% amide-modified | 63 | [4] | 191,000 |
| 7 | 12 | 100% amide-modified | 51 | 100,000 | 118,000 |
| 4 | 13 | 100% urea-modified | 63 | 230,000 | 221,000 |

[1] ASTM E-140
[2] ASTM D-790
[3] ASTM D-638
[4] Breaks in clamp

TABLE VIII

Solvent Resistance

| Diamine from Example | Plaque from Example | Weight Ratio of Modified/Unmodified Diamine | Solvent Resistance (% wt gain)[1] | | | |
|---|---|---|---|---|---|---|
| | | | Water | Methanol | Toluene | MEK[2] |
| Comp. Ex. 1 | Comp. Ex. 2 | 100% unmodified | 1.1 | 18.3 | 8.6 | 25.6 |
| 6 | 11 | 10% amide-modified | 1.6 | 22.1 | 5.9 | 25.7 |
| 6 | 8 | 100% amide-modified | 1.3 | 26.8 | 0.4 | 12.0 |
| 7 | 12 | 100% amide-modified | 2.7 | 42.3 | 40.3 | 56.3 |
| 4 | 13 | 100% amide-modified | 1.0 | 25.3 | 0.6 | 19.4 |

[1] % weight gain when soaked in a given solvent for 8 days at ambient temperature
[2] methylethylketone

TABLE IX

Impact Properties

| Diamine from Example | Plaque from Example | Weight Ratio of Modified/Unmodified Diamine | Notched Izod | Max Force | Energy to Max Force | Energy to Break |
|---|---|---|---|---|---|---|
| Comp. Ex. 1 | Comp. Ex. 2 | 100% unmodified | 1.8 | 410 | 2.20 | 2.80 |
| 6 | 11 | 10% amide-modified | 0.2 | 70 | 0.14 | 0.20 |
| 6 | 8 | 100% amide-modified | * | 20 | 0.03 | 0.07 |
| 7 | 12 | 100% amide-modified | * | * | * | * |
| 4 | 13 | 100% amide-modified | * | 25 | 0.05 | 0.11 |

*too brittle to cut

COMPARATIVE EXAMPLE 3

Preparation of a Prepolymer Comprised of a 2000 Molecular Weight Diamine Containing N-Isopropyl End Groups and Isonate TM 143LM A silanized, 100-ml resin kettle with a four-necked top is equipped with a mechanical stirrer, thermometer, vacuum inlet and a pressure equalizing addition funnel capped with a rubber septum. The kettle is charged with 40.29 g (0.2740 equivalents) of Isonate TM 143LM (a version of Isonate TM 143L which has a higher percentage of the para-para isomer) and placed under a vacuum of 0.5 mm Hg. Jeffamine TM D-2000 (49.80 g, 0.0507 equivalents) which had previously been converted to its N-isopropyl derivative is charged to the addition funnel through the septum via a syringe. The kettle is heated to 70° C. in an oil bath and the stirrer is started. The diamine is then added dropwise to the kettle over a 45-minute period while the stirring and vacuum are maintained.

Had the diamine not been capped with the isopropyl groups, interfacial polymerization would have occurred at this point in the procedure which in turn would have affected the prepolymer structure. After a reaction time of 5 hours, a standard HCl/di-n-butylamine titration (ASTM D-1638-74) is done to determine the prepolymer's equivalent weight. At this time the equivalent weight of the prepolymer is 398.86 g/equivalent with an NCO content of 10.53 weight percent.

COMPARATIVE EXAMPLE 4

Preparation of a Polymer Based on 1,4-Butanediol and the Prepolymer Made in Comparative Example 3

The reaction set up and equipment are used that were used for Comparative Example 3. The prepolymer that was made in Comparative Example 3 is allowed to cool to 50° C. while the stirring and vacuum are maintained. 1,4-Butanediol (9.83 g, 0.2182 equivalents) is added to the prepolymer through the septum via a syringe. The mixture is stirred and degassed for 4 minutes during which a 20° C. exotherm is observed. The vacuum is broken and the contents of the kettle are poured into a 4"×4"×0.125" steel window mold lined with mylar sheets which is then closed and allowed to sit overnight at room temperature before being opened. The amount of 1,4-butanediol added to the prepolymer is calculated to give the resulting polymer a hard segment concentration of 50 weight percent. The index (the ratio of isocyanate groups to hydroxyl groups) is 1.03.

When removed from the mold, the polymer plaque is very flexible and a few small bubbles are seen on its top surface. The plaque is a light yellow color. Half the plaque is post cured in a vacuum oven at 150° C. for one hour. It turns a slightly darker shade but has no other visible changes. Properties of the materials are given hereinbelow.

EXAMPLE 15

Preparation of a Prepolymer Comprised of Isonate TM 143LM and a 90/10 Weight Blend of a 2000 Molecular Weight Diamine Containing N-Isopropyl End Groups of Comparative Example 3 and the Amide Modified Diamine Containing N-Isopropyl End Groups of Example 6

The same reaction set up is used as in Comparative Example 3. The kettle is charged with 40.09 g (0.2760 equivalents) of Isonate TM 143LM and placed under a vacuum of 0.5 mm Hg. A diamine blend (50.10 g, 0.0515 equivalents) which consisted of 89.98 weight percent of the 2000 molecular weight diamine containing N-isopropyl end groups of Comparative Example 3 and 10.07 weight percent of the amide modified diamine containing isopropyl end groups of Example 6, is charged to the addition funnel through the septum via a syringe. The kettle is heated to 65° C. in an oil bath and the stirrer is started. The diamine is then added dropwise to the kettle over a 45-minute period while the stirring and vacuum are maintained.

Had the diamine not been capped with the isopropyl groups, interfacial polymerization would have occurred at this point in the procedure which in turn would have affected the prepolymer structure. After a reaction time of 3 hours, a standard HCl/di-n-butylamine titration (ASTM D-1638-74) is done to determine the prepolymer's equivalent weight. At this point the equivalent weight of the prepolymer is 398.51 g/equivalent with an NCO content of 10.54 weight percent.

EXAMPLE 16

Preparation of a Polymer Based on 1,4-Butanediol and the Prepolymer Made in Example 15

The reaction set up and equipment are used that were used for Comparative Example 3. The prepolymer that was made in Example 15 is allowed to cool to 50° C. while the stirring and vacuum are maintained. 1,4-Butanediol (9.85 g, 0.2186 equivalents) is added to the prepolymer through the septum via a syringe. The mixture is stirred and degassed for 3 minutes during which a 20° C. exotherm is observed. The vacuum is broken and the contents of the kettle are poured into a 4"×4"×0.125" steel window mold lined with mylar sheets which is then closed and allowed to sit overnight at room temperature before being opened. The amount of 1,4-butanediol added to the prepolymer is calculated to give the resulting polymer a hard segment concentration of 50 weight percent. The index is 1.03.

When removed from the mold, the polymer plaque is very flexible and a few small bubbles are seen on its top surface. The plaque is a light yellow color with some light brown speckling throughout the plaque. Half the plaque is post cured in a vacuum oven at 150° C. for one hour. It turns a slightly darker shade but has no other visible changes. Properties of the materials are given hereinbelow.

EXAMPLE 17

Preparation of a Prepolymer Comprised of Isonate TM 143LM and an 85/15 Weight Blend of a 2000 Molecular Weight Diamine Containing N-Isopropyl End Groups of Comparative Example 3 and the Amide Modified Diamine Containing N-Isopropyl End Groups of Example 6

The same reaction set up is used as in Comparative Example 3. The kettle is charged with 40.11 g (0.2727 equivalents) of Isonate TM 143LM and placed under a vacuum of 0.5 mm Hg. A diamine blend (49.77 g, 0.0507 equivalents) which consisted of 83.38 weight percent of the 2000 molecular weight diamine containing N-isopropyl end groups of Comparative Example 3 and 16.62 weight percent of the amide modified diamine containing isopropyl end groups of Example 6, is charged to the addition funnel through the septum via a syringe. The kettle is heated to 70° C. in an oil bath and the stirrer is started. The diamine is then added dropwise to the kettle over a 45-minute period while the stirring and vacuum are maintained. After a reaction time of 3 hours, a standard HCl/di-n-butylamine titration (ASTM D-1638-74) is done to determine the prepolymer's equivalent weight. At this point the equivalent weight of the prepolymer is 396.14 g/equivalent with an NCO content of 10.60 weight percent.

EXAMPLE 18

Preparation of a Polymer Based on 1,4-Butanediol and the Prepolymer Made in Example 17

The reaction set up and equipment are used that were used for Comparative Example 3. The prepolymer that was made in Example 17 is allowed to cool to 50° C. while the stirring and vacuum are maintained. 1,4-Butanediol (9.84 g, 0.2184 equivalents) is added to the prepolymer through the septum via a syringe. The mixture is stirred and degassed for 3 minutes during which a 20° C. exotherm is observed. The vacuum is broken and the contents of the kettle are poured into a 4"×4"×0.125" steel window mold lined with mylar sheets which is then closed and allowed to sit overnight at room temperature before being opened. The amount of 1,4-butanediol added to the prepolymer is calculated to give the resulting polymer a hard segment concentration of 50 weight percent. The index is 1.03.

When removed from the mold, the polymer plaque is very flexible and a few small bubbles are seen on its top surface. The plaque is a light yellow color with some light brown speckling throughout the plaque. Half the plaque is post cured in a vacuum oven at 150° C. for one hour. It turns a slightly darker shade and has a tiny amount of blistering. Properties of the materials are given hereinbelow.

EXAMPLE 19

Preparation of a Prepolymer Comprised of Isonate TM 143LM and an 80/20 Weight Blend of a 2000 Molecular Weight Diamine Containing N-Isopropyl End Groups of Comparative Example 3 and the Amide Modified Diamine Containing N-Isopropyl End Groups of Example 6

The same reaction set up is used as in Comparative Example 3. The kettle is charged with 40.25 g (0.2737 equivalents) of Isonate TM 143LM and placed under a vacuum of 0.5 mm Hg. A diamine blend (50.73 g, 0.0516 equivalents) which consisted of 78.79 weight percent of the 2000 molecular weight diamine containing N-isopropyl end groups of Comparative Example 3 and 21.21 weight percent of the amide modified diamine containing isopropyl end groups of Example 6, is charged to the addition funnel through the septum via a syringe. The kettle is heated to 70° C. in an oil bath and the stirrer is started. The diamine is then added dropwise to the kettle over a 45-minute period while the stirring and vacuum are maintained. After a reaction time of 3 hours, a standard HCl/di-n-butylamine titration (ASTM D-1638-74) is done to determine the prepolymer's equivalent weight. At this point the equivalent weight of the prepolymer is 426.09 g/equivalent with an NCO content of 9.86 weight percent.

EXAMPLE 20

Preparation of a Polymer Based on 1,4-Butanediol and the Prepolymer Made in Example 19

The reaction set up and equipment are used that were used for Comparative Example 3. The prepolymer that was made in Example 19 is allowed to cool to 50° C. while the stirring and vacuum are maintained. 1,4-Butanediol (9.29 g, 0.2062 equivalents) is added to the prepolymer through the septum via a syringe. The mixture is stirred and degassed for 3 minutes during which a 20° C. exotherm is observed. The vacuum is broken and the contents of the kettle are poured into a 4"×4"×0.125" steel window mold lined with mylar sheets which is then closed and allowed to sit overnight at room temperature before being opened. The amount of 1,4-butanediol added to the prepolymer is calculated to give the resulting polymer a hard segment concentration of 50 weight percent. The index is 1.03.

When removed from the mold, the polymer plaque is very flexible and has numerous pinhole size bubbles throughout. The plaque is a light yellow color with some light brown speckling throughout the plague. Half the plaque is post cured in a vacuum oven at 150° C. for one hour. It turns a slightly darker shade but otherwise appears unchanged. Properties of the materials are given hereinbelow.

EXAMPLE 21

Preparation of a Prepolymer Comprised of Isonate TM 143LM and an 75/25 Weight Blend of a 2000 Molecular Weight Diamine Containing N-Isopropyl End Groups of Comparative Example 3 and the Amide Modified Diamine Containing N-Isopropyl End Groups of Example 6

The same reaction set up is used as in Comparative Example 3. The kettle is charged with 40.01 g (0.2755 equivalents) of Isonate TM 143LM and placed under a vacuum of 0.5 mm Hg. A diamine blend (50.84 g, 0.0518 equivalents) which consisted of 75.00 weight percent of the 2000 molecular weight diamine containing N-isopropyl end groups of Comparative Example 3 and 25.00 weight percent of the amide modified diamine containing isopropyl end groups of Example 6, is charged to the addition funnel through the septum via a syringe. The kettle is heated to 65° C. in an oil bath and the stirrer is started. The diamine is then added dropwise to the kettle over a 45-minute period while the stirring and vacuum are maintained. After a reaction time of 3 hours, a standard HCl/di-n-butylamine titration (ASTM D-1638-74) is done to determine the prepolymer's equivalent weight. At this point the equivalent weight of the prepolymer is 410.98 g/equivalent with an NCO content of 10.22 weight percent.

EXAMPLE 22

Preparation of a Polymer Based on 1,4-Butanediol and the Prepolymer Made in Example 21

The reaction set up and equipment are used that were used for Comparative Example 3. The prepolymer that was made in Example 21 is allowed to cool to 50° C. while the stirring and vacuum are maintained. 1,4-Butanediol (9.64 g, 0.2139 equivalents) is added to the prepolymer through the septum via a syringe. The mixture is stirred and degassed for 2.25 minutes during which a 20° C. exotherm is observed. The vacuum is broken and the contents of the kettle are poured into a 4"×4"×0.125" steel window mold lined with mylar sheets which is then closed and allowed to sit overnight at room temperature before being opened. The amount of 1,4-butanediol added to the prepolymer is calculated to give the resulting polymer a hard segment concentration of 50 weight percent. The index is 1.03.

When removed from the mold, the polymer plaque is very flexible and of a light yellow color with some light brown speckling throughout the plaque. Half the plaque is post cured in a vacuum oven at 150° C. for one hour. It turns a slightly darker shade and slight blistering occurs. Properties of the materials are given hereinbelow.

EXAMPLE 23

Preparation of a Prepolymer Comprised of Isonate TM 143LM and an 70/30 Weight Blend of a 2000 Molecular Weight Diamine Containing N-Isopropyl End Groups of Comparative Example 3 and the Amide Modified Diamine Containing N-Isopropyl End Groups of Example 6

The same reaction set up is used as in Comparative Example 3. The kettle is charged with 40.20 g (0.2734 equivalents) of Isonate TM 143LM and placed under a vacuum of 0.5 mm Hg. A diamine blend (50.02 g, 0.0509 equivalents) which consisted of 69.99 weight percent of the 2000 molecular weight diamine containing N-isopropyl end groups of Comparative Example 3 and 30.01 weight percent of the amide modified diamine containing isopropyl end groups of Example 6, is charged to the addition funnel through the septum via a syringe. The kettle is heated to 65° C. in an oil bath and the stirrer is started. The diamine is then added dropwise to the kettle over a 45- minute period while the stirring and vacuum are maintained. The prepolymer is allowed to react for 2 hours at 65° C., then set overnight at 25° C. and is then heated an additional hour at 65° C. A standard HCl/di-n-butylamine titration (ASTM D-1638-74) is done to determine the prepolymer's equivalent weight. At this point the equivalent weight of the prepolymer is 396.88 g/equivalent with an NCO content of 10.58 weight percent.

EXAMPLE 24

Preparation of a Polymer Based on 1,4-Butanediol and the Prepolymer Made in Example 23

The reaction set up and equipment are used that were used for Comparative Example 3. The prepolymer that was made in Example 23 is allowed to cool to 50° C. while the stirring and vacuum are maintained. 1,4-Butanediol (9.85 g, 0.2186 equivalents) is added to the prepolymer through the septum via a syringe. The mixture is stirred and degassed for 2 minutes during which a 20° C. exotherm is observed. The vacuum is broken and the content of the kettle are poured into a 4"×4"×0.125" steel window mold lined with mylar sheets which is then closed and allowed to sit overnight at room temperature before being opened. The amount of 1,4-butanediol added to the prepolymer is calculated to give the resulting polymer a hard segment concentration of 50 weight percent. The index is 1.03.

When removed from the mold, the polymer plaque is very flexible and of a light yellow color with some light brown speckling throughout the plaque. Half the plaque is post cured in a vacuum oven at 150° C. for one hour. It turns a slightly darker shade and severe blistering occurs. Properties of the materials are given hereinbelow.

EXAMPLE 25

Preparation of a Prepolymer Comprised of Isonate TM 143LM and an 60/40 Weight Blend of a 2000 Molecular Weight Diamine Containing N-Isopropyl End Groups of Comparative Example 3 and the Amide Modified Diamine Containing N-Isopropyl End Groups of Example 6

The same reaction set up is used as in Comparative Example 3. The kettle is charged with 40.18 g (0.2767 equivalents) of Isonate TM 143LM and placed under a vacuum of 0.5 mm Hg. A diamine blend (51.26 g, 0.0522 equivalents) which consisted of 60.05 weight percent of the 2000 molecular weight diamine containing N-isopropyl end groups of Comparative Example 3 and 39.95 weight percent of the amide modified diamine containing isopropyl end groups of Example 6, is charged to the addition funnel through the septum via a syringe. The kettle is heated to 75° C. in an oil bath and the stirrer is started. The diamine is then added dropwise to the kettle over a 45-minute period while the stirring and vacuum are maintained. After a reaction time of 5 hours, a standard HCl/di-n-butylamine titration (ASTM D-1638-74) is done to determine the prepolymer's equivalent weight. At this point the equivalent weight of the prepolymer is 407.50 g/equivalent with an NCO content of 10.31 weight percent.

EXAMPLE 26

Preparation of a Polymer Based on 1,4-Butanediol and the Prepolymer Made in Example 25

The reaction set up and equipment are used that were used for Comparative Example 3. The prepolymer that was made in Example 25 is allowed to cool to 50° C. while the stirring and vacuum are maintained. 1,4-Butanediol (9.70 g, 0.2153 equivalents) is added to the prepolymer through the septum via a syringe. The mixture is stirred and degassed for 2 minutes during which a 20° C. exotherm is observed. The vacuum is broken and the contents of the kettle are poured into a 4"×4"×0.125" steel window mold lined with mylar sheets which is then closed and allowed to sit overnight at room temperature before being opened. The mount of 1,4-butanediol added to the prepolymer is calculated to give the resulting polymer a hard segment concentration of 50 weight percent. The index is 1.03.

When removed from the mold, the polymer plaque is very flexible and some mixing lines are visible. The plaque is a light yellow color. Half the plaque is post cured in a vacuum oven at 150° C. for one hour. It turns a slightly darker shade and blisters severely. Properties of the materials are given hereinbelow.

EXAMPLE 27

Measurement of Physical Properties

All the samples measured are post cured in a vacuum oven at 150° C. for one hour. Modulus values are measured using a dynamic test at 1.0 Hz. Table X shows a general enhancement of the polymer's modulus as the concentration of the amide modified diamine, from Example 6, in the diamine blend used in the prepolymer preparation is increased. This result can be explained as being due to an increased in the hydrogen bond density of the soft segment, brought about by the amide moieties in the diamine's backbone, which in turn causes virtual cross-links to occur between hard segment and soft segment chains which raise the modulus.

Table XI shows a significant decrease (improvement) in the coefficient of linear thermal expansion (C.L.T.E.) as the concentration of the amide modified diamine, from Example 6, in the diamine blend used in the prepolymer preparation is increased. This as well, can be explained as a result of increased virtual cross-linking which limits molecular motion.

TABLE X

| | Flexural Storage Modulus (E') | |
|---|---|---|
| Polymer from Example | Conc. of Backbone Modified Diamine in Diamine Blend | E' (Kpsi; 25° C.) |
| Comp. Ex. 4 | 0% | 24.73 |
| 16 | 10% | 22.51 |
| 18 | 15% | 23.13 |
| 20 | 20% | 28.26 |
| 22 | 25% | 32.03 |
| 24 | 30% | 32.69 |
| 26 | 40% | 42.69 |

TABLE XI

| | Coefficient of Linear Thermal Expansion (C.L.T.E.) (m × 10$^{-6}$/m °C.) | |
|---|---|---|
| Polymer from Example | Conc. of Backbone Modified Diamine in Diamine Blend | C.L.T.E. (25° C.) |
| Comp. Ex. 4 | 0% | 203 |
| 16 | 10% | 167 |
| 18 | 15% | 161 |
| 20 | 20% | 156 |
| 22 | 25% | 153 |
| 24 | 30% | 145 |
| 26 | 40% | 139 |

EXAMPLE 28

Preparation of a Secondary Amine Containing Amide Moieties in its Backbone Based on Jeffamine TM D-400 and 2-Methyl-1,5-pentanediamine Preparation of a Primary Diamine Containing Amide Moieties in its Backbone Based on Jeffamine TM D-400 and 2-Methyl-1,5-pentanediamine A primary, aliphatic diamine containing amide moieties in its backbone is prepared by reacting Jeffamine TM D-400 (460.0 g, 1.000 mole) and 2-methyl-1,5-pentanediamine (23.26 g, 0.200 mole) with adipic acid (140.31 g, 0.960 mole; amine:adipic acid molar ratio=1.25:1) using the same reactor setup used in Example 6, except using a 1-liter reactor. The contents of the flask are heated at 130° C. for 1 hour to form the corresponding amine salt. Toluene (50 ml) is added and the water formed during the reaction is removed in the Dean Stark trap (165° C./24 hours). The bulk of the toluene is removed from the trap by continued heating until a pot temperature of 190° C. is reached. The product is finished by heating at reduced pressure to remove the remaining toluene. The product is a light yellow, viscous liquid with the following properties: basicity, 0.833 meq/g; molecular weight by end group titration, 2401; Brookfield viscosity, >2,000,000 at 25° C.

Preparation of the N-Isopropyl End Group Derivative Using PdO/Pd on Carbon Catalyst System A portion of the primary amine prepared above (110 g), acetone (35 g) and PdO catalyst (2.1 g) plus 5 percent Pd on carbon catalyst (2.1 g) are placed in a 300-cc Autoclave Engineers reactor under a nitrogen purge. Hydrogen gas is added to 425 psig. This mixture is heated to 150° C. for 7 hours with a stirrer running at 1600 rpm. The product is washed with methanol and filtered from the catalyst, followed by removal of the volatiles in a rotating vacuum flask heated to 125° C. Analysis of the product by carbon-13 NMR shows complete conversion of the primary amino groups to isopropylamino end groups.

EXAMPLE 29

Preparation of a Prepolymer Comprised of Isonate TM 143LM and a 70/30 Weight Blend of a 2000 Molecular Weight Diamine Containing N-Isopropyl End Groups of Example 9 and the Amide/2-Methyl Pentanediamine-Modified Diamine Containing N-Isopropyl Groups of Example 28

The same reactor setup is used as in Comparative Example 3. The kettle is heated to 75° C. and is then charged with 15.40 g (0.0112 equivalent) of the 2-methyl pentanediamine-modified diamine of Example 28 and 40.15 g (0.2743 equivalent) of Isonate TM 143LM (a version of Isonate TM 143L which has a higher percentage of the para-para isomer; trademark of The Dow Chemical Company). The mixture is allowed to cool to 60° C. and 34.94 g (0.0355 equivalent) of the 2000 molecular weight diamine containing N-isopropyl end groups of Example 9 is added dropwise, through the addition funnel, over a 45-minute period to the kettle. After a reaction time of 3 hours, a standard HCl/di-n-butylamine titration (ASTM D-1638-74) is done to determine the prepolymer's equivalent weight. The prepolymer has an equivalent weight of 393.45 g/equivalent and an NCO content of 10.67 weight percent.

EXAMPLE 30

Preparation of a Polymer Based on 1,4-Butanediol and the Prepolymer Made in Example 29

The prepolymer made in Example 29 (57.72 g, 0.1467 equivalent) and 1,4-butanediol (6.53 g, 0.1449 equivalent) are mixed together in a plastic beaker for 2 minutes and the contents are then poured into a 4"×4"×0.125" steel window mold lined with mylar sheets and sprayed with a teflon mold release agent. The mold is placed in a 150° C. oven for one hour. The mold is removed from the oven and allowed to cool to room temperature. The polymer plaque has an index of 1.01 and a hard segment content of 50 weight percent.

When removed from the mold, the plaque is post-cured for one hour at 150° C. in an oven with a nitrogen purge. Properties of the polymer are given hereinbelow.

EXAMPLE 31

Preparation of a Prepolymer Comprised of Isonate TM 143LM and an 80/20 Weight Blend of Voranol TM 2120 and the Amide/2-Methyl Pentanediamine-Modified Diamine Containing N-Isopropyl Groups of Example 28

The same reactor setup is used as in Comparative Example 3. The kettle is heated to 75° C. and is then charged with 10.24 g (0.0075 equivalent) of the 2-methyl pentanediamine-modified diamine of Example 28 and 40.15 g (0.2743 equivalent) of Isonate TM 143LM. The mixture is placed under vacuum and stirred for 30 minutes. The mixture is allowed to cool to 55° C. and 39.88 g (0.0406 equivalent) of Voranol ™ 2120 (trademark of The Dow Chemical Company) is added dropwise, through the addition funnel, over a 45-minute period to the kettle. After a reaction time of 3 hours, a standard HCl/di-n-butylamine titration (ASTM D-1638-74) is done to determine the prepolymer's equivalent weight. The prepolymer has an equivalent weight of 376.70 g/equivalent and an NCO content of 11.15 weight percent.

EXAMPLE 32

Preparation of a Polymer Based on 1,4-Butanediol and the Prepolymer Made in Example 31

The same reaction setup is used as in Example 30. 1,4-Butanediol (10.32 g, 0.2290 equivalent) is added to the resin kettle and mixed with the prepolymer made in Example 31 for 2 minutes. The contents of the kettle are then poured into a 4"×4"×0.125" steel window mold lined with mylar sheets and sprayed with a teflon mold release agent. The mold is placed in a 150° C. oven for one hour. The mold is removed from the oven and allowed to cool to room temperature. The polymer plaque has an index of 1.03 and a hard segment content of 50 weight percent.

When removed from the mold, the plaque is post-cured for one hour at 150° C. in an oven with a nitrogen purge. Properties of the polymer are given hereinbelow.

COMPARATIVE EXAMPLE 5

Preparation of an Isocyanate-Functional Prepolymer Comprised of Isonate ™ 143LM and Voranol ™ 2120

A silanized, 100-ml resin kettle with a four-necked top is equipped with a mechanical stirrer, thermometer, vacuum inlet and a pressure equalizing addition funnel capped with a rubber septum. The kettle is heated to 40° C. in an oil bath and then charged with 40.20 g (0.2740 equivalents) of Isonate ™ 143LM. The stirrer is then started and the kettle is placed under a vacuum of 0.5 mm Hg. Voranol ™ 2120 (49.95 g, 0.0495 equivalent) is charged to the addition funnel through the septum via a syringe. The Voranol ™ 2120 is then added dropwise to the kettle over a 45- minute period while the stirring and vacuum are maintained. A dibutyltin dilaurate catalyst solution (5 percent, 0.474 g) in Voranol ™ 2120 is added to the prepolymer (0.0027 weight percent).

After a reaction time of approximately 3 hours, a standard HCl/di-n-butylamine titration (ASTM D-1638-74) is done to determine the prepolymer's equivalent weight. The prepolymer's equivalent weight is 406.98 g/equivalent with an NCO content of 10.32 weight percent.

COMPARATIVE EXAMPLE 6

Preparation of a Polymer Based on 1,4-Butanediol and the Prepolymer Made in Comparative Example 5

The reaction setup and equipment are used that were used in Comparative Example 3. 1,4-Butanediol (9.64 g, 0.2139 equivalent) is added to the prepolymer through the septum via a syringe. The mixture is stirred under vacuum for approximately one minute. The vacuum is then broken and the contents of the kettle poured into a 4"×4"×0.125" steel window mold lined with mylar sheets. The mold is then closed and placed in a 150° C. oven for one hour after which it is removed and allowed to cool before being opened. The amount of 1,4-butanediol added is calculated to give a hard segment content of 50 weight percent. The index (ratio of isocyanate groups to hydroxyl groups) is 1.03.

After being removed from the mold, the plaque is post-cured at 150° C. for one hour in a vacuum oven and cut apart for testing. Test results are given hereinbelow.

TABLE XII

| Plaques from Exper. No. | Flexural Storage Modulus at 25° C. (E'. Kpsi) | Coefficient of Linear Thermal Expansion at 25° C. ($\times 10^{-6}$/°C.) |
|---|---|---|
| Comp. Ex. 4 | 24.74 | 203 |
| 30 | 27.31 | 155 |
| Comp. Ex. 6 | 16.92 | 206 |
| 32 | 20.29 | 177 |

Example 30 shows the effect of a composition of this invention as a 30 weight percent additive to a N-isopropyl end capped polyether diamine. Example 32 shows the effect of a composition of this invention as a 20 weight percent additive to a polyether polyol. In both cases, the addition of the composition of this invention increases (improves) the modulus of the resultant polyurethane/urea elastomer, while reducing (improving) its coefficient of linear thermal expansion.

EXAMPLE 33

Preparation of a Diketimine of a Diamine Containing Six Amide Moieties in its Backbone on Jeffamine ™ D-400 and Adipic Acid A diamine containing about six amide moieties in its backbone is prepared from Jeffamine ™ D-400 and adipic acid. (1.30:1 D-400; adipic acid molar ratio). This diamine (219.1 g, 0.100 mol, MW=2191), cyclohexanone (21.60 g; 0.220 mol) and toluene (150 ml) are combined in a 500 ml reactor equipped with a magnetic stirrer, thermometer, Dean-Stark water trap, condenser, temperature controller and maintained under a nitrogen atmosphere. The reactor is heated at 128° C. for 9 hours, while separating the byproduct water formed in the water trap (97 percent of theory). The product is rinsed into a 500 ml, single necked flask with dry toluene and the volatiles removed on a rotary evaporator, finishing at 95° C. and 15 mm Hg. The flask is transferred to a higher vacuum system and finished at 120° C./1 mm Hg for 2 hours. The product is obtained as a straw colored, viscous liquid (229.8 g): Brookfield viscosity, 388,400 cps at 24° C. carbon-13 NMR. Analysis of the product by carbon-13 NMR indicates that the product contains an average of six amide moieties in its backbone per molecule.

EXAMPLE 34

Preparation of an Isocyanate Functional Prepolymer Comprised of Isonate ™ 143LM and a 75/25 Weight Blend of Voranol ™ 2120 and the Diketimine of Example 33

A silanized, 100 ml resin kettle with a four necked top is equipped with a mechanical stirrer, thermometer, vacuum inlet and a pressure equalizing addition funnel capped with a rubber septum. The kettle is heated to 60° C. and then charged with 12.17 g (0.0104 equivalents) of the diamine made in Example 33 and 40.11 g (0.2842 equivalents) of Isonate ™ 143LM. The stirrer is then started and the kettle was placed under vacuum. The contents of the kettle are allowed to react for 30 minutes afterwhich, 38,05 g (0.0387 equivalents) of Voranol ™

2120 (a 2000 MW polypropylene glycol, sold by The Dow Chemical Company) is added. dropwise via the addition funnel, over a 45 minute period to the kettle while the vacuum and stirring where maintained.

After a reaction time of approximately three hours, a standard HCl/di-n-butylamine titration (ASTM D-1638-74) is done to determine the prepolymer's equivalent weight. The equivalent weight is 394.65 g/equivalent with an NCO content of 10.64 weight percent.

EXAMPLE 35

Preparation of a Polymer Based on 1,4-butanediol and the Prepolymer made in Example 34

The reaction setup and equipment are used that were used in Example 34. 9.95 g (0.2208 equivalents) of 1,4-butanediol is added to the prepolymer through the septum via a syringe. The mixture is stirred under vacuum for approximately 1.25 minutes afterwhich, the vacuum was broken and the mixture was poured into a 4"×4"×0.125" steel window mold lined with mylar sheets. The mold is then closed and placed in a 150° C. oven for one hour afterwhich, it is removed and allowed to cool before being opened. The amount of 1,4-butanediol added is calculated to give a hard segment content of 50 weigh percent. The Index (ratio of isocyanate to hydroxyl groups) is 1.03.

After being removed from the mold, the plaque is post cured in a nitrogen atmosphere for one hour at 150° C. and then cut apart for testing. The flexural storage modulus (25° C.) is 30.8 Kpsi and the coefficient of linear thermal expansion (C.L.T.E. ×10$^{-6}$/°C. is 160 (measured at 25° C.).

EXAMPLE 36

A portion (129.65 g, 0.100 mole) of the secondary amine prepared in Example 1 is combined with the diglycidyl ether of bis(hydroxyphenyl)methane (17.37 g, 0.050 mole) and 0.15 g of A-1 catalyst (ethyltriphenyl phosphonium acetate-acetic acid complex, 70% in methanol) in a 250 ml, 3-necked flask equipped with a temperature controller, overhead stirrer, thermometer, and condenser and maintained under a nitrogen atmosphere. The resulting reaction mixture is heated with stirring to 175° C. for 3 hours. On cooling, the product is recovered as a light amber liquid: 1.4094 meq amine/g (HCl titration), Mn (2838)=2838, Tg=−37° C., Brookfield viscosity=270,400 cps (0.6 rpm, spindle #LV4, and 25° C.). Based upon the foregoing measurements and Carbon-13 NMR analysis, the product is determined to be an advanced liquid epoxy resin having terminal secondary amine groups and internal urea carbonyl moieties.

Following the foregoing procedure except that the molar ratio of the secondary amine to epoxy resin is 1.5:1 and 0.23 g (0.1 weight percent) of the catalyst is used, an advanced liquid epoxy resin having a Brookfield viscosity of 875,000 cps is obtained. Thus, by reducing the mole ratio of the amine extender to epoxy resin, the molecular weight of the advanced epoxy resin is increased.

A portion (129.61 g, 0.100 mole) of the amine of Example 1 is combined with the diglycidyl ether of bis(hydroxyphenyl)methane (69.41 g, 0.200 mole) and 0.20 g of the A-1 catalyst in the aforementioned reactor. The resulting reaction mixture is heated with stirring to 175° C. and a gel is formed after 25 minutes, indicating that the epoxy product is cross-linked by further reaction with the urea moieties. The Tg of the polymer gel is −9° C.

EXAMPLE 37

Following the procedure of Example 36, a portion (115.44 g, 0.040 mole) of the secondary amine of Example 6 is combined with the diglycidyl ether of bis(hydroxyphenyl)methane (27.77 g, 0.080 mole) and 0.14 g of the A-1 catalyst in the reactor used in Example 33. The resulting reaction mixture is heated with stirring under nitrogen to 175° C. for 3 hours. Upon cooling the product is recovered as a light amber liquid: 1.013 meq epoxy/g, epoxy equiv. wt.=1972, Mn =3946, Tg=−21° C., and Brookfield viscosity=>2,000,000 cps. Based upon these measurements and Carbon-13 NMR analysis, the product is determined to be an advanced liquid epoxy resin having terminal oxiranyl groups and internal amide carbonyl moieties.

Generally following the foregoing procedure, a portion (144.3 g, 0.05 mole) of the foregoing secondary amine, a diglycidyl ether of bisphenol-A advanced to a Mn of 1254 (125.4 g, 0.100 mole) and 0.27 g of the A-1 catalyst are combined and reacted to form a product: 0.5188 meq epoxy/g, epoxy equiv. wt.=3855, Mn=7710, Tg=7° C., and Brookfield viscosity=>2,000,000 cps. Based upon these measurements and Carbon-13 NMR analysis, the product is determined to be an advanced liquid epoxy resin having terminal oxiranyl groups and internal amide carbonyl moieties.

EXAMPLE 38

Following the procedure of Example 36, a portion (229.85 g, 0.020 mole) of the secondary amine of Example 7 is combined with the diglycidyl ether of bis(hydroxyphenyl)methane (4.40 g, 0.010 mole) and 0.23 g of the A-1 catalyst in the reactor used in Example 33. The resulting reaction mixture is heated with stirring under nitrogen to 175° C. for 3 hours. Upon cooling the product is recovered as an amber liquid: 0.2036 meq amine/g, Mn=19650, Tg=−60° C., and Brookfield viscosity=68,400 cps. Based upon these measurements and Carbon-13 NMR analysis, the product is determined to be an advanced liquid epoxy resin having terminal oxiranyl groups and internal amide moieties.

Following the foregoing procedure except that the molar ratio of the secondary amine to epoxy resin is 1.33:1 and 0.23 g (0.1 wt %) of the A-1 catalyst is used, an advanced liquid epoxy resin having 0.6502 meq amine/g, Tg=−61° C. and a Brookfield viscosity of 128,800 cps is obtained. Thus, by reducing the mole ratio of the amine extender to epoxy resin, the molecular weight of the advanced epoxy resin is increased.

What is claimed is:

1. An imine comprising
   a backbone portion containing a plurality of polyalkyleneoxy moieties and one or more internal urea, thiourea, biuret, thiobiuret, amide, or thioamide moieties, and
   a plurality of imino end groups,
   wherein each imino group is separated from a urea, thiourea, biuret, dithiobiuret, amide, or thioamide moiety by at least one alkylene, cycloalkylene, aralkylene, arylene, alkyleneoxy, or polyalkyleneoxy moiety with 4-20 carbon atoms.

2. The imine of claim 1 which contains at least one internal urea moiety.

3. The imine of claim 1 which contains at least one internal biuret moiety.

4. The imine of claim 1 which contains at least one internal amide moiety.

5. The imine of claim 1 which contains at least one alkylene, cycloalkylene, aralkylene, arylene, alkyleneoxy moiety.

6. A secondary amine comprising
a backbone portion containing a plurality of polyalkyleneoxy moieties which are connected by one or more internal moieties selected from the group consisting of urea, thiourea, biuret, thiobiuret, amide, and thioamide moieties, and
a plurality of secondary amino end groups,
wherein each amino end group is separated from a urea, thiourea, biuret, dithiobiuret, amide, or thioamide moiety by an alkylene, cycloalkylene, aralkylene, arylene, alkyleneoxy, or polyalkyleneoxy moiety with 4–20 carbon atoms.

7. The secondary amine of claim 6 which contains at least one internal urea moiety.

8. The secondary amine of claim 6 which contains at least one internal biuret moiety.

9. The secondary amine of claim 6 which contains at least one internal amide moiety.

10. The secondary amine of claim 6 which contains at least one alkylene, cycloalkylene, aralkylene, arylene, alkyleneoxy moiety.

11. A process for preparing an imine containing at least one internal urea, thiourea, biuret, thiobiuret, amide, or thioamide moiety in its backbone, which comprises contacting
(a) a modified polyamine comprising a backbone portion containing at least one polyalkyleneoxy moiety and one or more internal urea, thiourea, biuret, dithiobiuret, amide, or thioamide moieties, and a plurality of primary amino end groups wherein each amino end group is separated from each urea, thiourea, biuret, dithiobiuret, amide, or thioamide moiety by at least one alkylene, cycloalkylene, aralkylene, arylene, alkyleneoxy, or polyalkyleneoxy moiety with 4–20 carbon atoms; with
(b) an aldehyde or ketone
under reaction conditions effective to form an imine.

12. The process of claim 11 wherein the aldehyde or ketone is acetone, acetaldehyde, methylethylketone, benzaldehyde, cyclohexanone, cyclopentanone, 4-methyl-2-pentanone, or diethylketone.

13. The process of claim 12 wherein the ketone is acetone.

14. The process of claim 12 wherein the ketone is cyclohexanone.

15. The process of claim 11 wherein the modified polyamine contains at least one urea moiety.

16. The process of claim 11 wherein the modified polyamine contains at least one amide moiety.

17. A process for preparing a secondary amine containing at least one internal urea, thiourea, biuret, thiobiuret, amide, or thioamide in its backbone, which comprises hydrogenating an imine comprising
a backbone portion containing at least one polyalkyleneoxy moiety which are connected by one or more internal moieties selected from the group consisting of urea, thiourea, biuret, dithiobiuret, amide, and thioamide moieties, and a plurality of primary amino end groups wherein each amino end group is separated from each urea, thiourea, biuret, dithiobiuret, amide, or thioamide moiety by an alkylene, cycloalkylene, aralkylene, arylene, alkyleneoxy, or polyalkyleneoxy moiety with 4–20 carbon atoms
under reaction conditions effective to form a secondary amine.

18. The process of claim 17 which is carried out in the presence of a palladium or platinum catalyst.

19. The process of claim 18 wherein the catalyst is employed in an amount in the range of from about 1 percent to about 10 percent by weight of the imine.

20. The process of claim 17 wherein step (b) is carried out at a temperature in the range of from about 100° C. to about 150° C.

21. The process of claim 17 wherein the imine contains at least one urea moiety.

22. The process of claim 17 wherein the imine contains at least one amide moiety.

23. An isocyanate-functional prepolymer which comprises the reaction product of
(1) a secondary amine comprising
a backbone portion containing a plurality of polyalkyleneoxy moieties which are connected by one or more internal moieties selected from the group consisting of urea, thiourea, biuret, thiobiuret, amide, and thioamide moieties, and
a plurality of secondary amino end groups,
wherein each amino end group is separated from a urea, thiourea, biuret, dithiobiuret, amide, or thioamide moiety by an alkylene, cycloalkylene, aralkylene, arylene, alkyleneoxy, or polyalkyleneoxy moiety with 4–20 carbon atoms with
(2) an excess over stoichiometry of a polyisocyanate.

24. A urethane/urea polymer which comprises the reaction product of the isocyanate-functional prepolymer of claim 23 with at least one polyahl.

25. A urethane/urea polymer which comprises the reaction product of at least one of the secondary amines of claim 6 with at least one organic polyisocyanate.

26. The urethane/urea polymer of claim 25 which has been post-cured.

27. A urethane/urea polymer which is the reaction product of at least one of the secondary amines of claim 6 with at least one organic polyisocyanate and at least one polyahl.

28. The urethane/urea polymer of claim 27 which has been post-cured.

29. An isocyanate-functional prepolymer which comprises the reaction product of
(1) an imine comprising
a backbone portion containing a plurality of polyalkyleneoxy moieties and one or more internal urea, thiourea, biuret, dithiobiuret, amide or thioamide moieties, and
a plurality of imine end groups,
wherein each imine end group is separated from a urea, thiourea, biuret, dithiobiuret, amide, or thioamide by at least one alkylene, cycloalkylene, aralkylene, arylene, alkyleneoxy, or polyalkyleneoxy moiety with 4–20 carbon atoms with
(2) an excess over stoichiometry of a polyisocyanate.

30. A urethane/urea polymer which comprises the reaction product of the isocyanate-functional prepolymer of claim 29 with at least one polyahl.

31. A urethane/urea polymer which comprises the reaction product of one or more imines with a backbone portion containing a plurality of polyalkyleneoxy moieties and one or more moieties selected from the group consisting of urea, biuret, thiourea, dithiobiuret, amide, and thioamide with at least one organic polyisocyanate.

32. A composition comprising an epoxy resin and the secondary amine of claim 6, wherein the secondary amine is present in an amount effective to extend and/or cure the epoxy resin.

33. A composition comprising an epoxy resin and the imine of claim 1, wherein the imine is present in an amount effective to extend and/or cure the epoxy resin.

* * * * *